US009462477B2

(12) United States Patent
Ahmad et al.

(10) Patent No.: US 9,462,477 B2
(45) Date of Patent: Oct. 4, 2016

(54) FLEXIBLE NETWORK SHARING

(71) Applicant: InterDigital Patent Holdings, Inc., Wilmington, DE (US)

(72) Inventors: Saad Ahmad, Montreal (CA); Kai Liu, S. Huntington, NY (US); Guanzhou Wang, Longueuil (CA); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 12 days.

(21) Appl. No.: 13/890,640

(22) Filed: May 9, 2013

(65) Prior Publication Data

US 2013/0303114 A1 Nov. 14, 2013

Related U.S. Application Data

(60) Provisional application No. 61/673,529, filed on Jul. 19, 2012, provisional application No. 61/644,986, filed on May 9, 2012.

(51) Int. Cl.
*H04M 11/00* (2006.01)
*H04W 16/14* (2009.01)
*H04W 4/26* (2009.01)
(Continued)

(52) U.S. Cl.
CPC .......... *H04W 16/14* (2013.01); *H04L 12/1407* (2013.01); *H04L 12/1442* (2013.01); *H04L 41/5077* (2013.01); *H04M 15/49* (2013.01); *H04M 15/51* (2013.01); *H04M 15/54* (2013.01); *H04M 15/66* (2013.01); *H04M 15/805* (2013.01); *H04M 15/8038* (2013.01); *H04W 4/26* (2013.01); *H04W 88/18* (2013.01)

(58) Field of Classification Search
CPC .. H04W 4/24; H04M 2215/32; H04M 15/00
USPC .......................... 455/406, 450, 414.1, 422.1
See application file for complete search history.

(56) References Cited

U.S. PATENT DOCUMENTS

2009/0154413 A1 6/2009 Kim et al.
2009/0161688 A1 6/2009 Park et al.
(Continued)

FOREIGN PATENT DOCUMENTS

WO WO 2009/071431 A1 6/2009
WO WO 2013/166472 A1 11/2013

OTHER PUBLICATIONS

3rd Generation Partnership Project (3GPP), TR 22.951 V10.0.0, "3rd Generation Partnership Project; Technical Specification Group Services and System Aspects; Service aspects and requirements for network sharing (Release 10)", Mar. 2011, 19 pages.
3rd Generation Partnership Project (3GPP), R3-120036, "Discussion on the Scenarios for Network Sharing", ZTE, 3GPP TSG-RAN WG3, Meeting #75, Dresden, Germany, Feb. 6-10, 2012, 2 pages.
(Continued)

*Primary Examiner* — Nghi H Ly
(74) *Attorney, Agent, or Firm* — Condo Roccia Koptiw LLP

(57) ABSTRACT

Flexible sharing of common radio access network (RAN) resources may pool unallocated resources. For example, sharing of the network resources may be static, e.g., the sharing contract may define a fixed percentage allocation of network resources that may not be modified without change in contract. The sharing of the network resource may also be dynamic and may accommodate the capacity needs of hosted operators on a real-time basis.

14 Claims, 27 Drawing Sheets

(51) Int. Cl.
*H04L 12/24* (2006.01)
*H04L 12/14* (2006.01)
*H04M 15/00* (2006.01)
*H04W 88/18* (2009.01)

(56) References Cited

U.S. PATENT DOCUMENTS

| | | |
|---|---|---|
| 2010/0197268 A1 | 8/2010 | Raleigh |
| 2011/0158184 A1 | 6/2011 | Agulnik et al. |
| 2014/0073288 A1* | 3/2014 | Velasco .......... 455/411 |
| 2014/0148165 A1* | 5/2014 | Serravalle et al. .......... 455/436 |

OTHER PUBLICATIONS

3$^{rd}$ Generation Partnership Project (3GPP), TS 23.251 V11.0.0, "3$^{rd}$ Generation Partnership Project; Technical Specification Group Services and System Aspects; Network Sharing; Architecture and functional description (Release 11)", Sep. 2011, 28 pages.

3$^{rd}$ Generation Partnership Project (3GPP), TS 32.426 V10.4.0, "3$^{rd}$ Generation Partnership Project; Technical Specification Group Services and System Aspects; Telecommunication management; Performance Management (PM); Performance measurements Evolved Packet Core (EPC) network (Release 10)", Jun. 2012, 60 pages.

* cited by examiner

FLEXIBLE NETWORK SHARING

CROSS-REFERENCE TO RELATED APPLICATIONS

This application claims the benefit of U.S. Provisional Application No. 61/673,529, filed on Jul. 19, 2012, and U.S. Provisional Application No. 61/644,986, filed on May 9, 2012. The contents of which are hereby incorporated by reference in their entirety.

BACKGROUND

Mobile network operators have been searching for cost-effective ways to meet increased demand on their networks due to growth in mobile broadband traffic. Some solutions involve increased indoor coverage, small cells, LTE, IP Ethernet backhaul, and/or more spectrum. These solutions, however, involve additional capital expenditure (Capex).

Sharing networks and network infrastructure may allow operators to share heavy deployment costs for mobile networks, especially in the rollout phase. Enhancements to existing Radio Access Network (RAN) sharing solutions may attempt to offer substantial savings. However, a need continues to exist for efficiently sharing common RAN resources by pooling unallocated resources.

SUMMARY

Systems, methods, and instrumentalities are disclosed for flexible network sharing. Common radio access network (RAN) resources may be shared by pooling unallocated resources.

Sharing of network resources may be static, e.g., the sharing contract may define a fixed percentage allocation of network resources that may not be modified without a change in the contract. In another example, the sharing of the network resources may be dynamic. The network sharing scheme may be flexible enough to accommodate the capacity needs of hosted operators on a real-time basis. The network, e.g., RAN operator may sell network capacity to the highest-bidding hosted operator.

Examples disclosed herein may provide means to verify that the shared network elements provide allocated RAN resources according to sharing agreements or policies. Examples disclosed herein may provide an indication of and potential actions upon overload situations in consideration of sharing agreements or policies.

An enhancement to the RAN sharing architecture may be defined. For a capacity brokering architecture, a network element may be provided, a function or functions may be added to a node or nodes, and an interface or interfaces may be provided. Network capacity may be defined with regard to what may be shared or what metrics may be used to express the slice of the network being allocated to a given hosted operator. Measurements may be provided to determine usage of shared network resources. Additionally, the gain of the network sharing may be quantified from the perspective of involved parties, e.g., network operators, hosted operators, and/or MVNOs.

A method for managing radio access network (RAN) capacity with different operators may be provided. A capacity query request requesting shared RAN resources may be received via a Brokerage Control Unit (BCU). Available shared RAN resources may be determined. A capacity query result may be transmitted to grant the requested shared RAN resources from the available shared RAN resources.

A method for managing radio access network (RAN) capacity with different operators may be provided. A capacity allocation cancellation request to cancel a request for shared RAN resources may be received via a Brokerage Control Unit (BCU). It may be determine whether the request for shared RAN resources can be cancelled. A capacity allocation cancellation result may be transmitted to indicate whether the request for shared RAN resources has been cancelled.

A method for controlling resource appropriation within a radio access network (RAN) may be provided. A query message may be transmitted to a Brokerage Control Unit (BCU) via a RAN node. A response message may be received from the BCU. The response message may include a resource allocation of a RAN resource that may be shared by one or more operators. It may be determined from the resource allocation that an operator from one or more operators may be using more than a resource threshold for the operator. For example, the operators may be using more than their quota of shared resources.

A method for controlling resource appropriation within a radio access network (RAN) may be provided. An allocation behavior report may be received from a network node via a Brokerage Control Unit (BCU). The allocation behavior unit may be for an operator. The usage of a resource allocated to the operator that may not comply with a resource allocation policy may be determined from the allocation behavior report. A message may be transmitted to the operator to adjust the usage of the resource allocated to the operator.

This Summary is provided to introduce a selection of concepts in a simplified form; these concepts are further disclosed below in the Detailed Description. This Summary is not intended to identify key features or essential features of the claimed subject matter, nor is it intended to be used to limit the scope of the claimed subject matter. Further, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

Figure 1A:
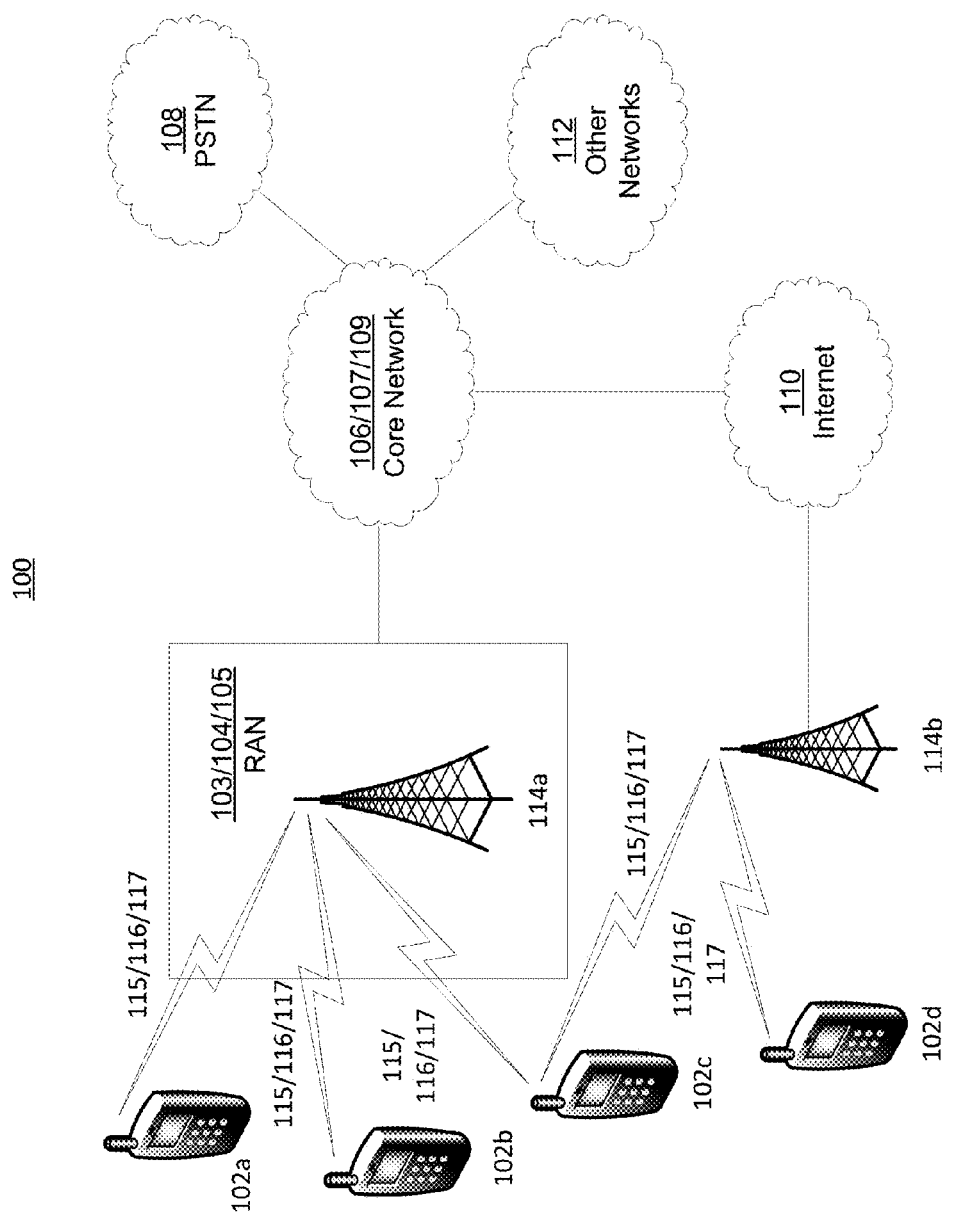
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
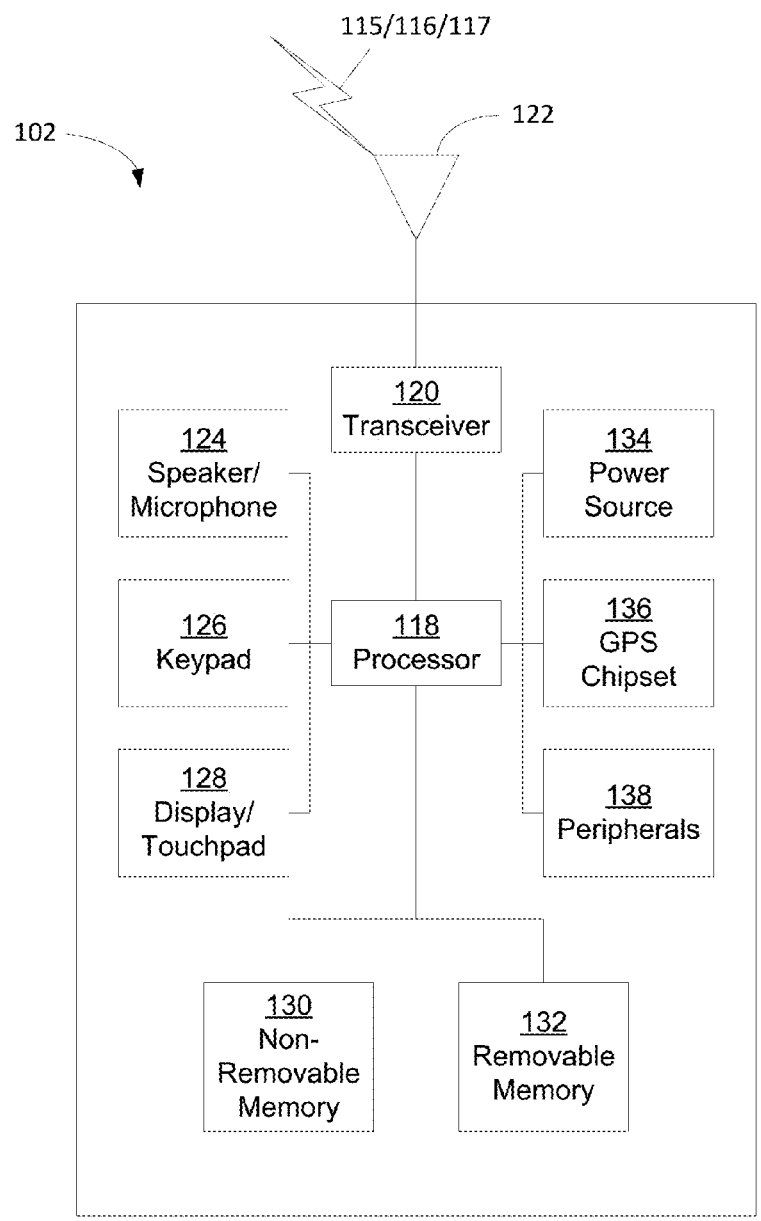
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that may not be physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
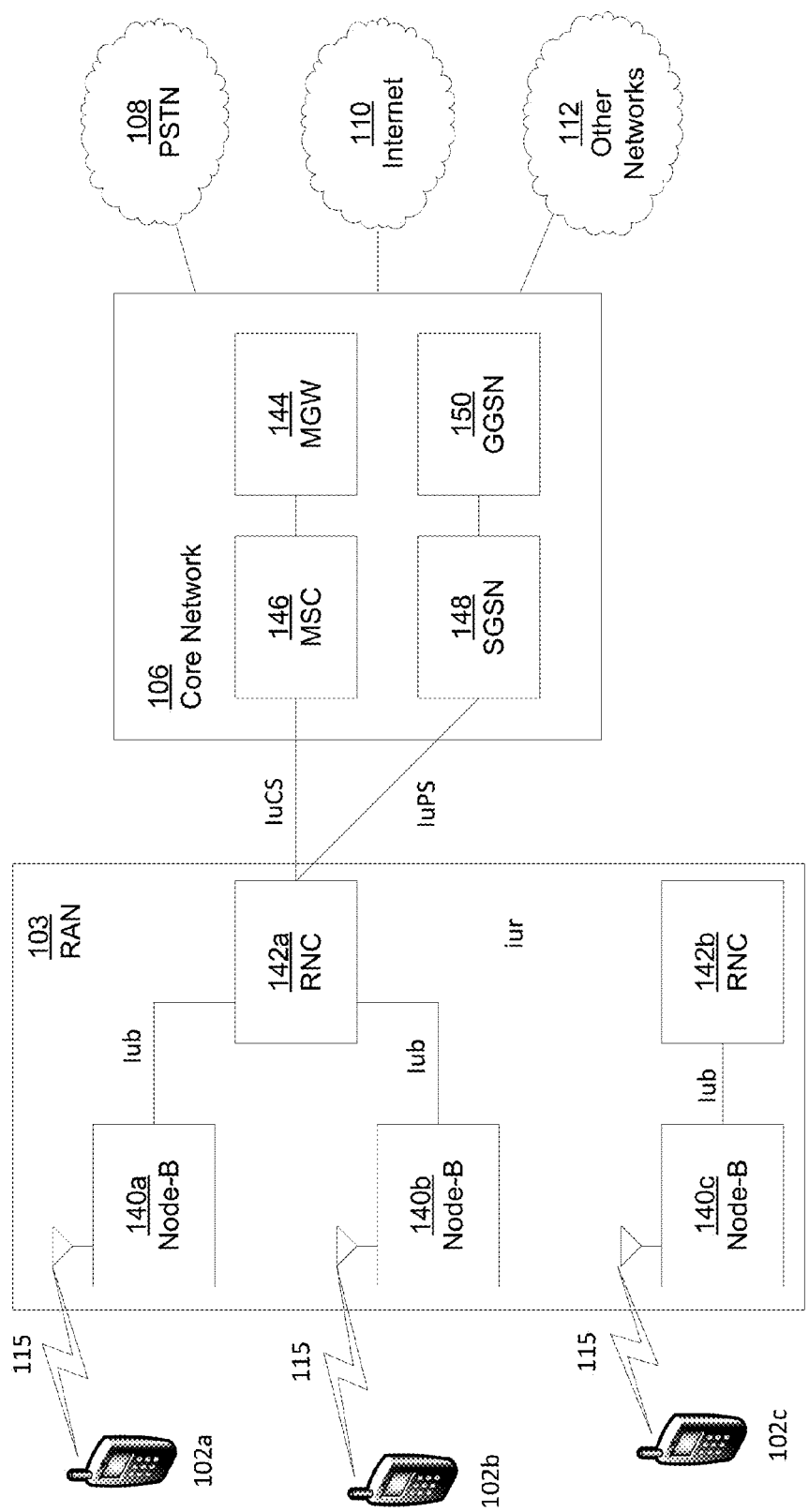
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
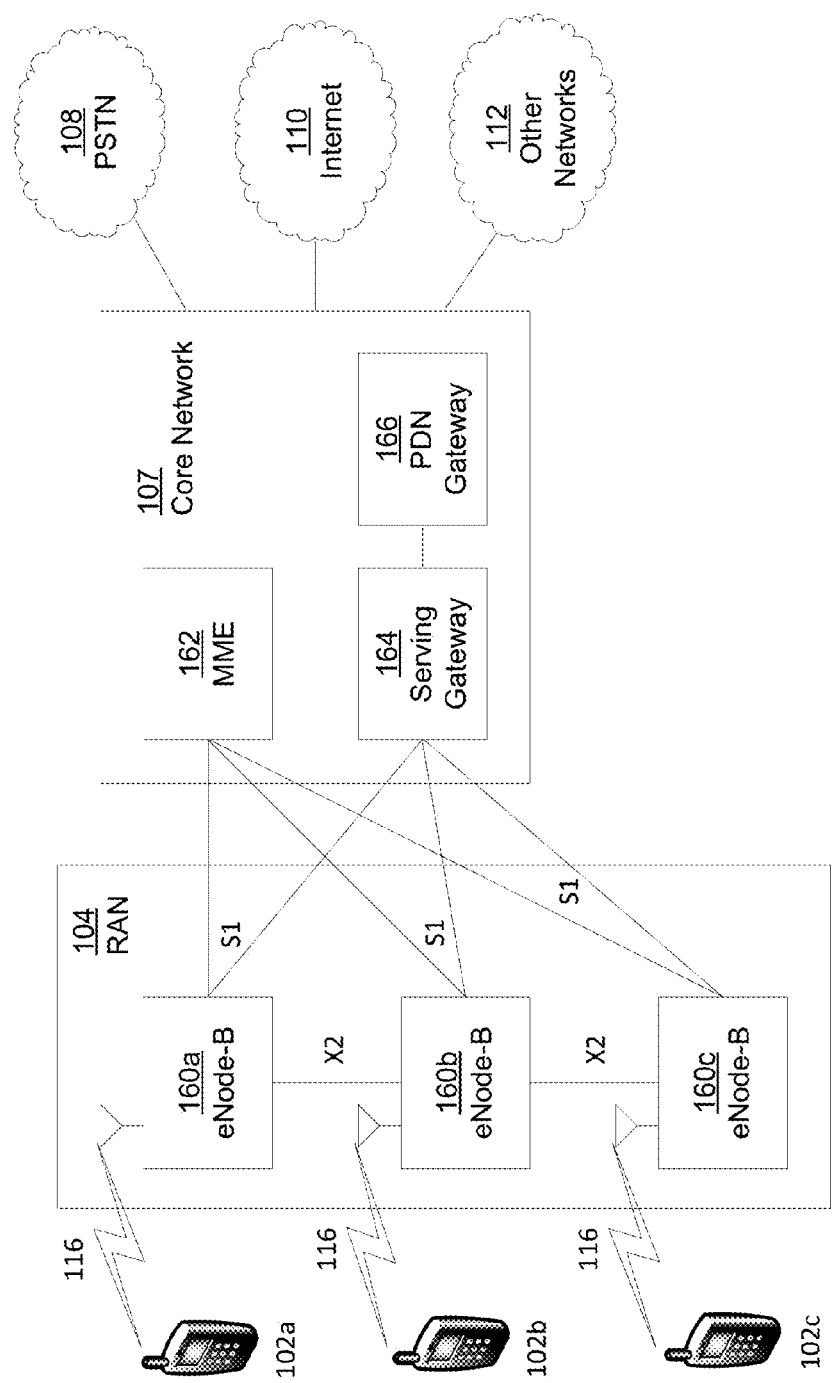
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
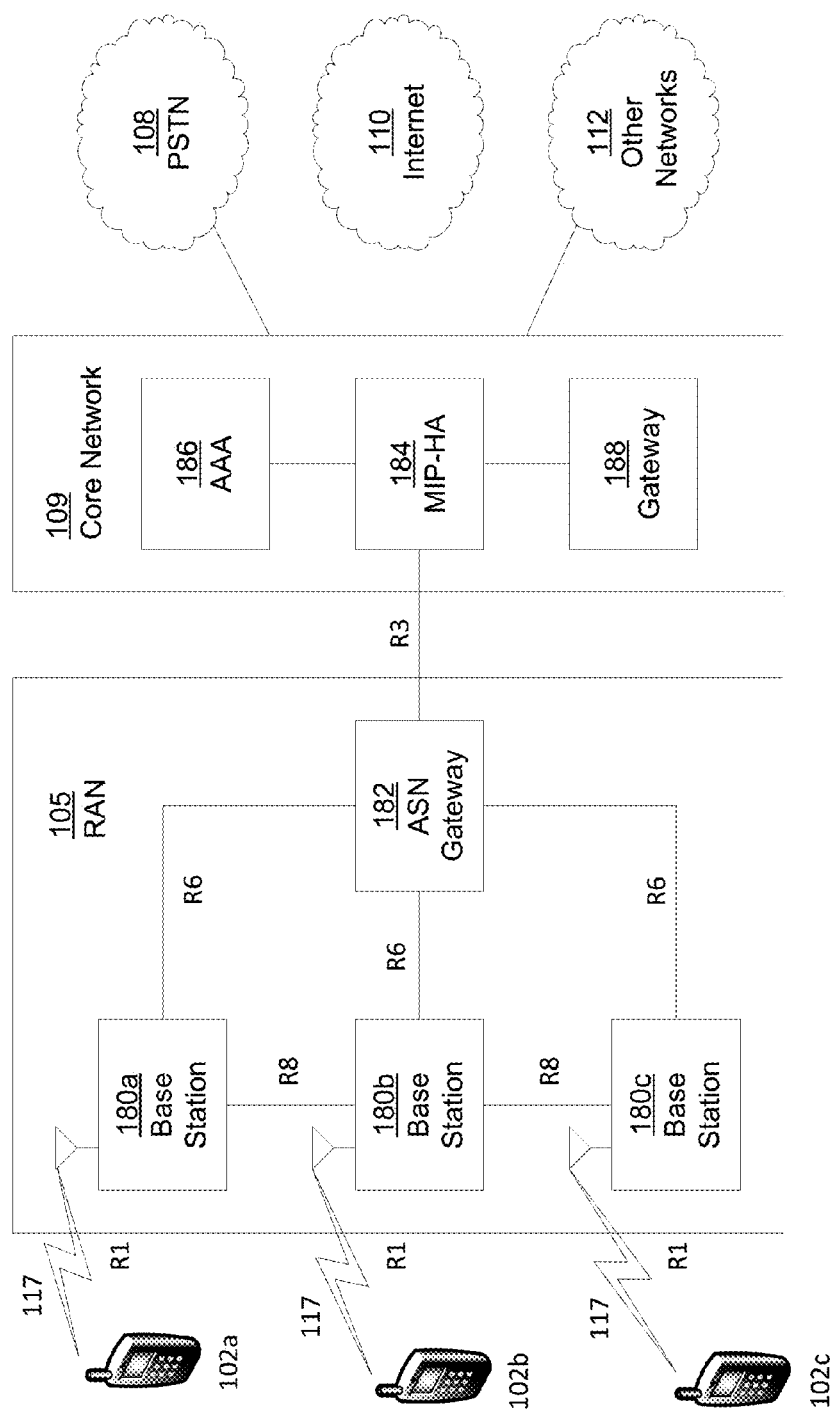
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A logical entity that may be responsible for managing capacity among different operators may be provided. The logical entity may be referred to as a Brokerage Control Unit (BCU). Metrics may be provided to express network capacity and/or network slice allocation to hosted operators. These metrics may be used individually or in combination with each other or other metrics.

A hosted operator may monitor different parameters in its network to identify whether more resources may be needed. The parameters may be on a per eNB basis. The parameters maybe based on a group of eNBs that may serve WTRUs in a region. eNBs may send the parameters to a logical entity in the network periodically or may send the parameters when requested to do so by a network node.

A hosted operator may discover available RAN operators that may be able to offer resources. This discovery may be performed, for example, using one or more methods that may include Operation, Administration, and Maintenance (OAM) procedures, discovery supported by a Home Subscriber Service (HSS), or the like. Upon discovering a RAN operator, a hosted operator may query the RAN operator for available resources. This may be done, for example, by sending a query message, such as a capacity query message. The message may be sent to the RAN operator or a BCU of the RAN operator. A capacity allocation request or response message exchange may be provided to allow resources to be requested from the RAN operator.

Unused allocated resources may be cancelled or withdrawn by either the hosted operator or the RAN operator. The operator wishing to cancel the allocated resource may send a cancellation request to the other operator to withdraw the resources. The decision to cancel the resources may be taken by the RAN operator.

To support per-PLMN offloading rules, a method or methods may be used to modify the handover triggering condition for WTRUs that belong to different PLMNs. For example, the handover trigger change IE in the Mobility Change Request Message for each PLMN may be duplicated. To support conditions under which peer eNBs may be shared by different hosted operators, the operator information (PLMN) may be included in the Handover Trigger Change IE.

The BCU or other OAM node may push certain policies to the shared node that may be applied when the hosted operator may go over its quota of allocated resources. A certain proportion of RAN resources may be kept by the RAN node as reserve resources and may not be allocated to any operator.

Figure 2:
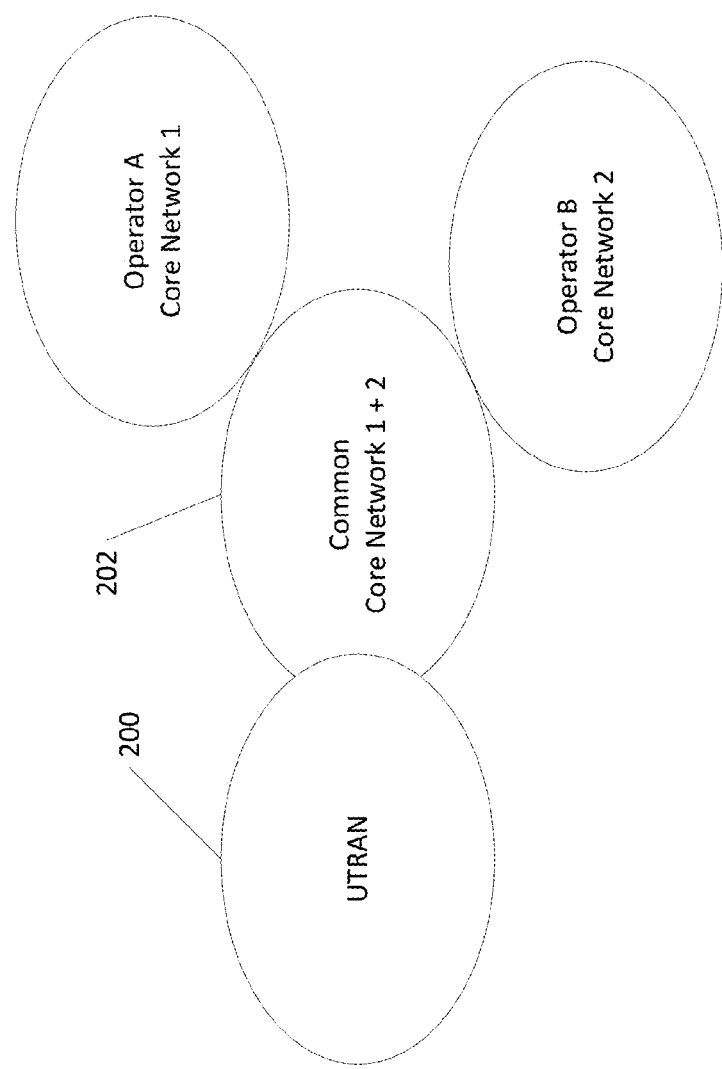
FIG. 2 is a diagram illustrating two mobile network operators sharing a Universal Terrestrial Radio Access Network (UTRAN)

Sharing networks and network infrastructure has become an important part of 3GPP systems. By sharing networks and network infrastructure, mobile network operators can share the heavy deployment costs for mobile networks, especially in the rollout phase. A number of network sharing scenarios may be possible and may depend on different operator strategies and legislation in different countries. 3GPP systems were originally not designed for network sharing between different operators. However, 3GPP Release 99 provides some limited support for network sharing. A PLMN feature in Release 99 allows operators to share a common UTRAN, with certain parts 202 of the core networks also shared between operators. FIG. 2 is a diagram illustrating two operators sharing a common UTRAN 200.

In the current mobile telephony marketplace, functionality that enables various forms of network sharing is becoming more and more important. These functional aspects have not been addressed before Release 6 in 3GPP UTRAN based access networks, before Release 8 in 3GPP E-UTRAN based access networks, and before Release 10 in 3GPP GERAN based access networks.

To cope with 3GPP pre-Release 6 UTRAN wireless transmit/receive units (WTRUs) and with non-supporting 3GPP GERAN WTRUs, extra functionality for MSCs, SGSNs, BSCs, and RNCs may provide network sharing functionality to non-supporting WTRUs.

In UMTS Release 8 and LTE Release 8, UTRAN and E-UTRAN capable WTRUs were needed to support network sharing requirements.

Some network sharing scenarios may include multiple core networks (CNs) sharing a common radio access network (RAN); geographically split networks sharing; network sharing over a common geographical area; common spectrum network sharing; and/or multiple radio access networks sharing a common core network.

Figure 3:
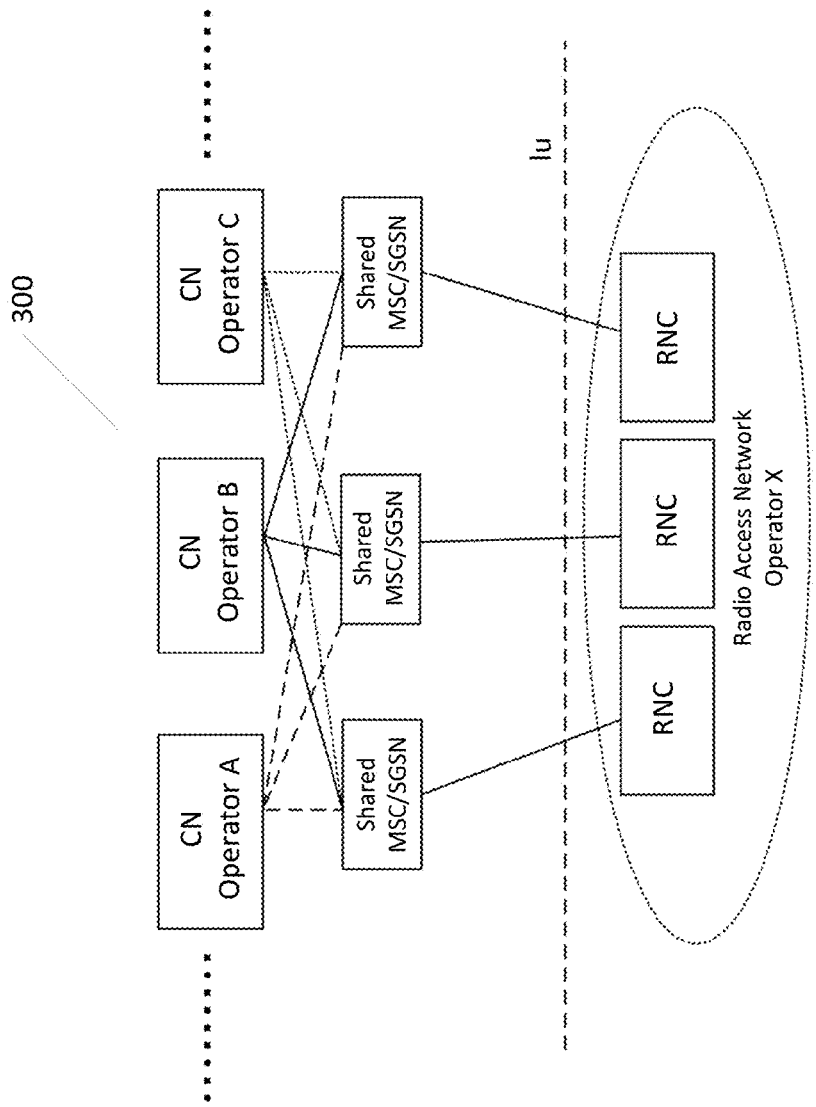
FIG. 3 is a diagram illustrating an example Gateway Core Network (GCN) configuration for network sharing.
Figure 4:
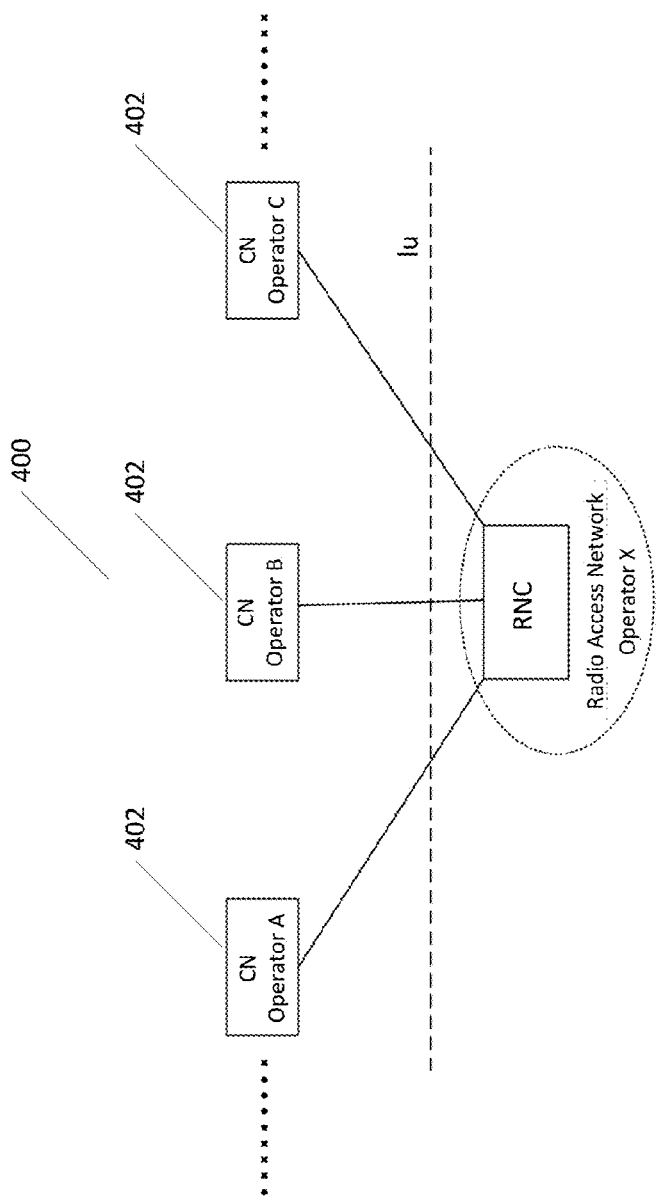
FIG. 4 is a diagram illustrating an example Multi-Operator Core Network (MOCN) in which multiple Core Network (CN) nodes are connected to a single Radio Network Controller (RNC)

FIG. 3 depicts an example Gateway Core Network (GWCN) configuration 300 for network sharing. FIG. 4 depicts an example Multi-Operator Core Network (MOCN) in which multiple CN nodes 402 are connected to the same RNC 404 and the CN nodes 402 may be operated by different operators. FIG. 3 and FIG. 4 illustrate two different kinds of network sharing arrangements. The network sharing architecture, whether GWCN or MOCN, may allow different core network operators to share a radio access network. The operators may share the radio network elements and may share the radio resources themselves. The carrier resources in an eNB may be shared by core network operators.

In network sharing, a carrier resource may be a shared carrier or a dedicated carrier. A shared carrier may be a carrier in an eNB that may be shared by multiple core network operators. A dedicated carrier may be a carrier in an eNB that may be exclusively used for a particular operator.

Network sharing may be used in various scenarios. For example, an operator operator 1 with PLMN ID1 may purchase an eNB and then may rent the eNB to another operator operator2 with PLMN ID2 and still another operator operator3 with PLMN ID3. The eNB may be shared by operator1, operator2, and operator3. A carrier may be regarded as an equivalent or analogous concept of a cell.

For an Evolved Packet System, the PS domain may be relevant. For E-UTRAN access, FIG. 3 and/or FIG. 4 may apply. However, the MME may replace the SGSN, an eNodeB may replace the RNC, and the S1 reference point may replace the Iu interface.

Mobile network operators have been searching for cost-effective ways to meet increased demand on their networks due to growth in mobile broadband traffic. Some solutions involve increased indoor coverage, small cells, LTE, IP Ethernet backhaul, and/or more spectrum. These solutions, however, involve additional capital expenditure (Capex).

A majority of the upfront costs may be related to establishing coverage. Approximately 70% of the capital expenditure may involve acquiring the sites, access equipment, civil works (e.g., construction of the site, installation of the equipment), and laying cables for electricity and backhaul.

Enhancements may be made to existing RAN sharing solutions that may promise to offer substantial operational expenditure and capital expenditure savings. These enhancements may usher in a new paradigm in network rollout strategy. For example, there may be at least three solutions in which these enhancements to RAN sharing may be highly beneficial. In a Greenfield deployment, two operators may agree to build out a new technology, e.g., 4G. At the outset, the new shared network infrastructure and operations may be based on capacity and coverage requirements of both operators. The operator may fund built-on 50:50 or according to their expected needs. In a buy-in solution, one of the sharing operators may have already built, for example, a 4G network, and may be looking for another operator to share the network. In this case, the second operator may either pay a capacity usage fee or upfront fee to acquire in the network. In a consolidation situation, 2G, 3G, and/or 4G networks, which may already be built out by sharing operators, may need to be consolidated into one joint network. This type of network sharing may hold significant cost advantages, but it may also present substantial design challenges.

In addition to capital expenditure (Capex) and operational expenditure (Opex) savings, there may also be indirect efficiency gains, such as a denser network that may give better indoor coverage and may lead to higher cell capacities.

Figure 5A:
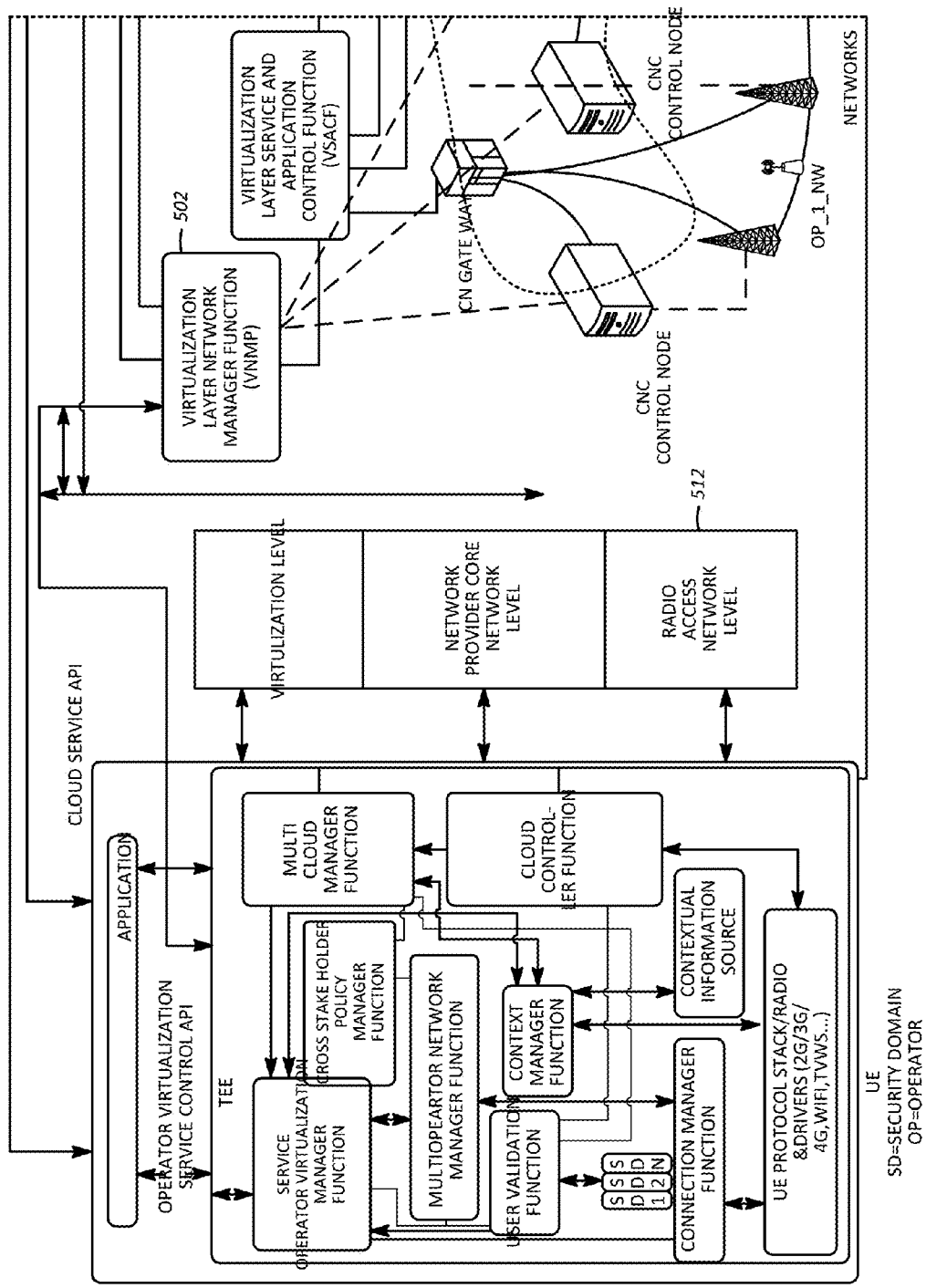
FIGS. 5A-5B represent a diagram illustrating an example virtual network.
Figure 5B:
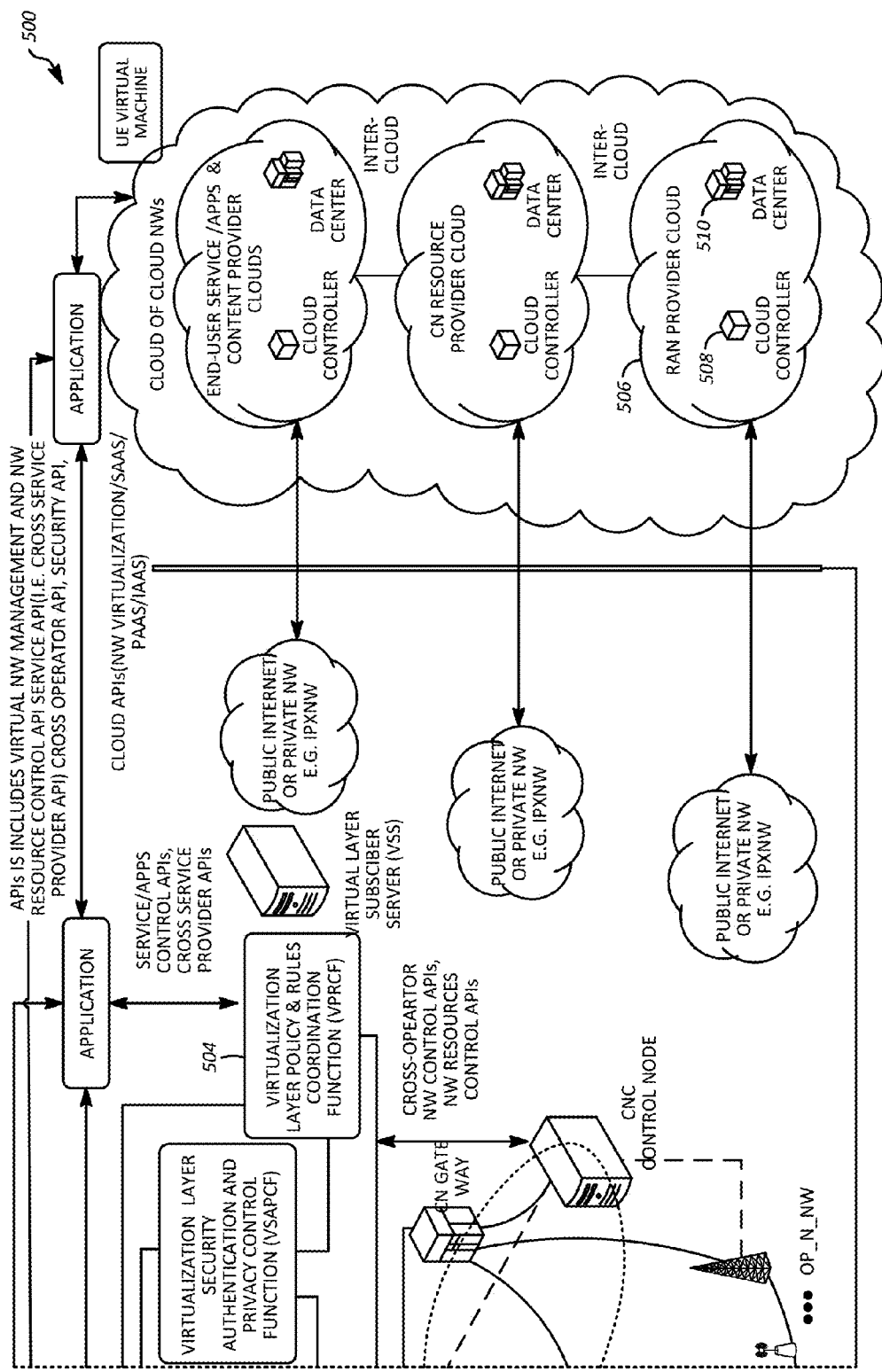

FIGS. 5A-5B illustrate an example end-to-end architecture of a virtualized network 500 that may include a WTRU architecture and a network architecture. The architecture may be a multidimensional virtualization architecture that can be characterized as an architecture of a network or networks that may include, by way of example, a radio access network (RAN), a core network (CN), a service network, and/or a cloud network. In one of the dimensions, the operators may be virtualized. In another dimension, the service providers may be virtualized. In another dimension, the network resources (e.g., computation resources, storage resources, networking logic, protocol and algorithms logic) including the RAN resources with potentially multiple different air interfaces (e.g., GSM, CDMA, WCDMA/HSDPA/HSUPA, TS-SCDMA, LTE, WiFi, WiMAX, etc.) may be virtualized in the cloud. Network resources virtualization in the context of a radio access network may be employed, for example, in a reconfigurable radio system. An architecture employing three dimensions of virtualization, e.g., operators, service providers, and network resources, may offer an operator-agnostic and/or technology access-agnostic and/or service provider-agnostic network and service access.

In another dimension, the network resources may be virtualized in the sense of dynamic resource pooling across multiple networks. Dynamic resource pooling may be used, for example, for radio access network resources (e.g., spectrum, radio resource block, cells, etc.) sharing. In another dimension, the WTRU resources (e.g., computation resources, storage resources, networking logic, protocol and algorithm logic) may be virtualized in the cloud. Network resource virtualization may be used in the context of the radio access network for reconfigurable radio systems.

In yet another dimension, services (e.g., business logic) provided to users or other business support services (e.g., charging and billing support system, operator support system, etc.) may be virtualized in the cloud. These dimensions may be integrated and/or activated together as depicted in FIGS. 5A-5B or may be activated individually or may be activated in any combination.

The virtualized network 500 may include a number of network nodes. A virtualization layer network manager function (VNMF) 502 may manage virtualized network resources and may control the operator's network resources across several stakeholders, e.g., operators. The VNMF 502 may be responsible for the setup and management of the virtualized bearers into each stakeholder network. The VNMF 502 may also be responsible for the management of the cloud bearers.

The VNMF 502 may directly interface or may employ application interface (API) primitives for one or more of a number of tasks. The VNMF 502 may interact with mobile service cloud networks and/or peer service networks to form a network of networks for a vaster networking and ubiquitous services provisioning. The VNMF 502 may interact with various operators' networks, e.g., core networks, and their related radio access networks for providing end user/WTRU connectivity to services and applications, which may include the command and control interactions with operator networks controlling node (MME/SGSN) for connection and network resource management. These core networks and/or radio access networks may be involved in establishing for the end user the service or application traffic path over the operator network's gateway nodes (e.g., S-GW, P-GW, GGSN) toward the VSACE node disclosed herein. The VNMF 502 may interact directly with the end user or WTRU to help the WTRU choose the suitable radio access network and operator's core network paths for control or data purposes with respect to the services or applications the mobile device end user selected based on the end user or WTRU's location or attachment point with the network. The VNMF 502 may maintain a user profile from various network operators, e.g., may be connected to various MMEs from different network operators. The VNMF 502 may maintain mobility management information when the WTRU moves between different operator networks. The VNMF 502 may interact with a financial institution or charging entity connected to a financial institution to ensure that the user has the required financial or charging credentials to access the virtual network system. The VNMF 502 may provide a list of available services and/or applications to the users and charging information related to those services and/or applications.

A virtualization layer policy and rules coordination function (VPRCF) 504 may be involved in service delivery in a multi-stakeholder service environment. The VPRCF 504 may consolidate and coordinate policies and rules across various stakeholders, such as network operators, virtual network operators, service providers (e.g., Amazon®, Google®, Yahoo®, Apple®, Facebook®, Twitter®, etc.), application providers or developers, content providers, financial institutions (e.g., banks, PayPal, etc.), identity providers (e.g., OpenID providers such as Google®, Yahoo®, MySpace®, etc.), device manufacturers, other trusted entities, and the like. Stakeholders may also include users and/or subscribers.

The VPRCF 504 may implement logic for resolving conflicts across multiple stakeholders. Such conflict resolution logic may use as inputs, for example, the preferences, rules, and/or policies of the user or subscriber, the service level agreement, the desired QoS/QoE, the price, the context, and/or other relevant inputs.

The VPRCF 504 may perform any of its functionality in coordination with a virtualization function in the WTRU, for example, a cross-stakeholder policy manager function in the WTRU. In another example, the VPRCF 504 may perform any of its functionality alone.

A network operator may be an entity, party, or operator, or the like that may own the network, e.g., a RAN or Core Network. As used in this disclosure, a network operator may also be referred to as a RAN operator, a hosting operator, or a hosting RAN operator. A network operator may allow its resources to be used by other operators and/or mobile virtual network operators (MVNOs). These resources may be on a carrier level, cell level, eNB level, and/or Core Network level and are further described herein.

A hosted operator or participating operator may be an entity, party, or operator, or the like that may request resources from a hosting operator. A hosted operator may request different types of resources as described herein with regard to a hosting operator. The hosted operator may not be a physical entity, but may be a virtual operator that may share the network with various hosting operators.

Static sharing may be a type of network sharing agreement that may take place between a hosting operator and a hosted operator in which the resource allocation may be agreed upon. The hosting operator may provide the agreed-upon resources to the hosted operator. A new agreement may be needed if the hosted operator may want to change the resource allocation.

Dynamic sharing may be a type of network sharing agreement in which the allocation of network resources may be changed or switched using manual or automatic OAM procedures between the hosting operator and the hosted operator. The hosted operator may dynamically ask the hosting operator for more resources, which the hosting operator may or may not allocate based on availability and other factors. This type of resource allocation may occur in a time frame of, for example, a few minutes to a few hours.

Real-time sharing may be a type of network sharing agreement in which the resource allocation may change rapidly, e.g., instantly, based on a request from a hosted operator. In this type of sharing, an OAM procedure may or may not be involved. The network nodes may belong to different sharing operators that may exchange messages directly to negotiate the new capacity or allocation of the resources. This type of resource sharing allocation may occur within a period of a few microseconds to a few seconds.

As used in this disclosure, the term Access Point Name (APN) may refer to a portal into a network (e.g., Internet, packet data network, or the like). APNs may be used to provide specific data services based on the definition of the APN as defined within a provisioned data rate plan. Each APN may enable access to a network, such as the Internet; however, that access and associated billing may differ from APN to APN.

As used in this disclosure, the term Default Access Point Name (APN) may refer to an APN that may be marked as a default in the subscription data and that may be used during an Attach procedure. A WTRU may have requested a PDN connectivity procedure when no APN has been provided by the WTRU.

As used in this disclosure, the term Packed Data Network (PDN) Connection may refer to an association between a WTRU represented by an IPv4 address and/or an IPv6 prefix and a PDN represented by an Access Point Name (APN).

As used in this disclosure, the term Default Bearer may refer to an Evolved Packet System (EPS) bearer that may be established for a new PDN connection and that may remain established throughout the lifetime of the PDN connection. One default bearer may exist per terminal IP address. Any additional EPS bearer or bearers that may be established for the same PDN connection may be referred to as a dedicated bearer. The QoS level of a default bearer may be assigned based on subscription data.

The examples disclosed herein may provide means for efficiently sharing common RAN resources, e.g., pooling of unallocated radio resources. The sharing of network resources may be static. The sharing contract may define a fixed percentage allocation of network resources that may not be modified without a change in the contract. The sharing of network resources may be dynamic. The network sharing scheme may be flexible enough to accommodate the capacity needs of hosted operators on a real-time basis. The network, e.g., RAN operator may sell network capacity to the highest bidding hosted operator.

The examples disclosed herein may provide means to verify that the shared network elements provide allocated RAN resources according to sharing agreements or policies. The disclosed examples may provide an indication of and potential actions that may be taken upon overload situations in consideration of sharing agreements or policies.

An enhancement to an existing RAN sharing architecture may be defined. For the architecture of the capacity brokering, new network elements may be involved, new functions may be added to existing nodes, and/or new interfaces may be provided. Network capacity may be defined with regard to what may be shared or what metrics may be used to express the slice of the network being allocated to a given hosted operator. New measurements may be provided to determine consumption of the shared network resources. Additionally, the gain of the network sharing may be quantified from the perspective of the involved parties, including, for example, hosting operators, hosted operators, and/or MVNOs. Additionally, when different operators pool resources for RAN sharing, charging of a WTRU may be performed according to the charging rules of the hosting operator to which the WTRU is subscribed. Different charging records may be generated for different WTRUs in a network. Additionally, RAN sharing may be performed in the case of operator virtualization, e.g., in a virtual network architecture.

Dynamic sharing may be provided. When RAN resources may be shared by different operators or MVNOs, these resources may be requested by the hosted operator on an on-demand basis. The proportion of these resources used by different operators may change over time. The need or request for additional resources from the hosted operator may be consistent, e.g., the hosted operator may send the same request every time. The need or request for additional resources from the hosted operator may be dynamic, in that the hosted operator, based on its network congestion situation, may send the request to the operator that owns the RAN resources. When the RAN operator receives the request, it may take some actions to verify the incoming request and may determine whether the resources may be allocated. If the RAN operator accepts the request, it may assign resources to the hosted operator.

The hosted operator may identify that it may require additional resources in the shared network. It may also specify the period for which resources may be needed, the quantity of the resources, and/or other parameters, such as a specific QoS, etc. There may be a number of ways in which a hosted operator may identify that more resources are needed, for example, via the parameters that it monitors and the different nodes involved in the process. In a network sharing scheme in which both the RAN infrastructure and the spectrum may be shared, the network's capacity to be shared may be expressed in terms of different resource types and/or resource units or a combination of different types of resources. There may be different RAN resources that may be shared, e.g., access preambles, control channel CCEs, shared PDSCH/PUSCH/PUCCHs. The resource or resources that may have capacity to be shared may be determined. Additionally, the unit of the shared capacity may be determined.

When a hosted operator determines that it may require additional resources, it may send a request to the RAN operator for resources. The request may be sent in a number of ways. Additionally, a request message may include a number of parameters. The hosted operator may be using the resources from different RAN networks, so it may determine which RAN operator it may send a request to, or it may determine whether it may send the request to one RAN operator or multiple RAN operators.

When the RAN operator receives the request, it may or may not accept the request. A number of rules and/or policies may be defined at the RAN operator that the RAN operator may take into consideration while assessing the request for resources from the hosted operator. Some procedures and methods at the RAN level may be performed to allocate the RAN resources to the hosted operator. Additionally, a method may be used to acknowledge that an allocation is available.

The allocated resources may be withdrawn or cancelled by the hosted operator or by the RAN operator. These resources may be cancelled before the hosted operator has started to use them. If the hosted operator has started using the resources, the remainder of the resources may be cancelled. Two different procedures may be used at the hosted operator side and at the RAN operator side. A number of factors and/or policies may lead to the cancellation of resources. The cancellation procedures may include a request procedure and/or messages of capacity allocation, a cancellation procedure and/or messages of initial request, and/or a query procedure and/or messages of available capacity.

In some situations, more than one hosted operator may request resources from a RAN operator at the same time, potentially causing a race condition. If the hosting operator has limited resources, the hosting operator may decide how to allocate resources in this race condition. Certain rules and/or procedures may be used to handle such a case.

Although some examples disclosed herein are described in the context of a RAN sharing scenario, they may also be applied to sharing of Core Network (CN) resources.

When a WTRU is in a connected mode and is moving, it may move from one cell to another cell. The WTRU may perform a seamless handover from its own network cell (e.g., the network to which the WTRU is subscribed) to a cell that belongs to a RAN operator (e.g., an operator that is providing additional capacity). The RAN operator may generate a charging or accounting record that describes the usage of the shared RAN. The charging record may be sent to the hosted operator and may describe the start and the end of the service provided to the WTRU. Further, some handovers, e.g., handovers between cells of a RAN operator, may not generate a charging event. The network may distinguish between events that are caused by movement of a WTRU to and from a shared RAN, which may involve the generation of an accounting or charging message, and mobility events that may not involve the generation of a message for accounting purposes.

Some load measurements do not distinguish the loads from different operators' networks when a RAN is shared by multiple core networks. Additionally, the X2 load exchange method does not distinguish between traffic from different operators.

Figure 6:
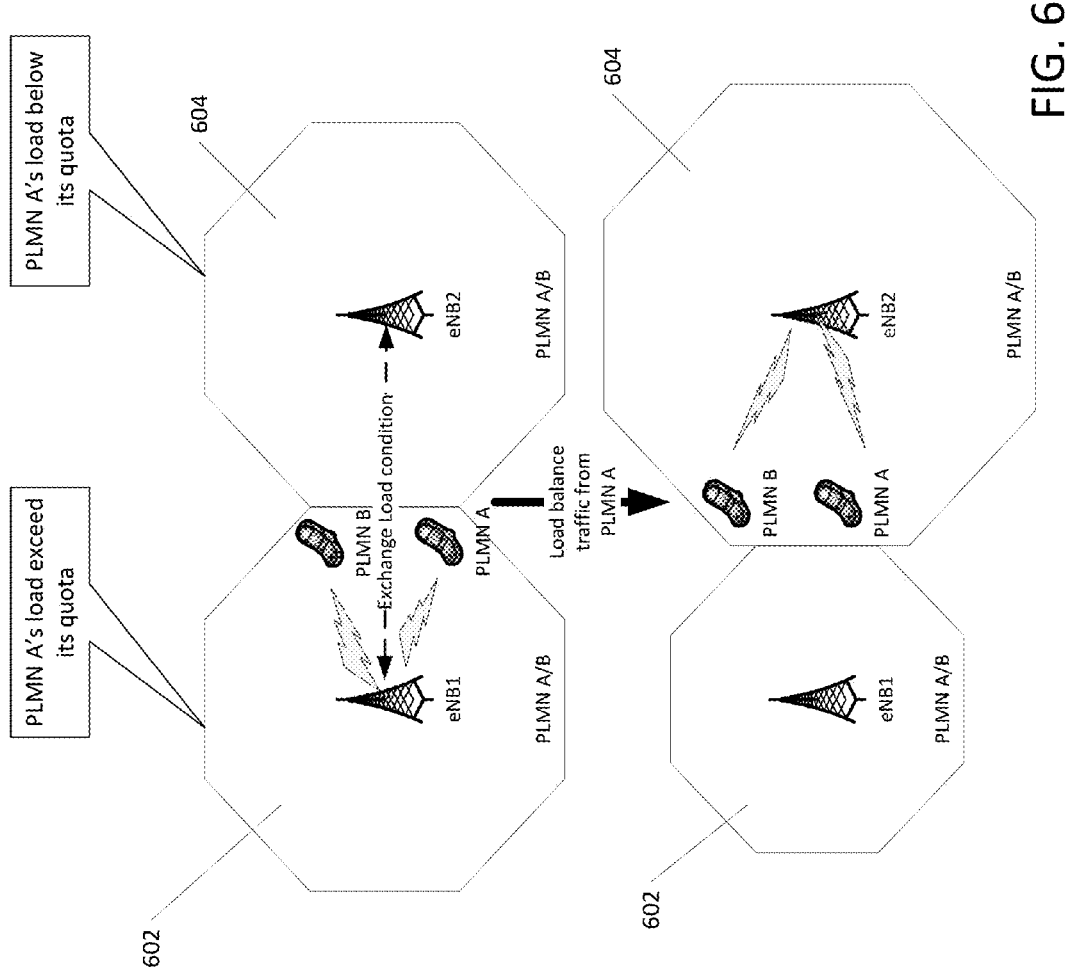
FIG. 6 is a diagram illustrating an example method for load balancing.

FIG. 6 depicts an example method for load balancing. In some load balancing procedures, when a cell 602 is overloaded, it may exchange its load information with its neighbor cells. The load balancing algorithm may choose a cell that does not have an overload condition and may offload traffic from the overloaded cell to one or more non-overloaded cells 604 by adjusting their handover parameters. Some load balancing procedures may not distinguish the network of the traffic when they offload traffic from overloaded cells to non-overloaded cells.

In the case of RAN sharing, the hosted operators may have different quotas on the RAN resources. The load chosen to be offloaded could be different toward different operators based on their usage and allocated quota on each RAN node.

Figure 7:
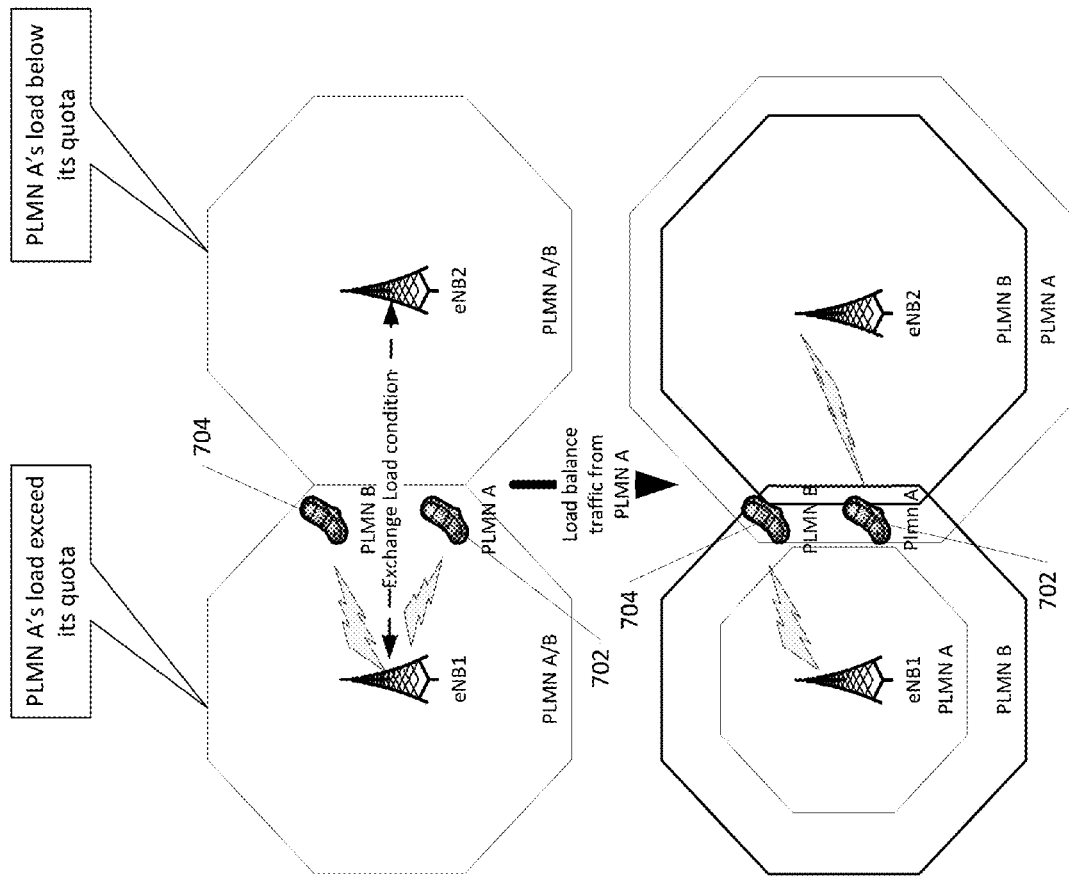
FIG. 7 is a diagram illustrating another example method for load balancing.

FIG. 7 depicts another load balancing method. As shown in FIG. 7, the RAN may be shared by two hosted operators 702, 704 with PLMN A and PLMN B, respectively. The eNB 1 may be in the overloaded condition with traffic from PLMN A exceeding the maximum quota set for operator A. The traffic from operator B in eNB 1 may be below the allocated quota for operator B. Traffic from operator A may be under its allocated quota in eNB2 and traffic from operator B may be just at its allocated quota. The traffic from operator A may be offloaded from eNB1 to eNB2.

To support operator-specific load balancing, a method may be used to measure the RAN traffic on PLMN bases. The PLMN specific load measurement may be used to determine the load condition on the traffic from each PLMN and may help determine which PLMN or PLMNs may overload the system.

Additionally, a load information exchange procedure may be used to include PLMN specific traffic in an X2 load update message. The load exchange message may be used to determine whether a PLMN's traffic may need to be offloaded and how much traffic from each PLMN may be offloaded from an overloaded cell. Additionally, the load exchange message may be used to determine how much traffic from each PLMN that a cell that is not overloaded may be able to take from the overloaded cells.

Cell mobility parameters may be used to negotiate the handover trigger settings with a peer eNB controlling neighboring cells. The change on the handover trigger settings may change the cell coverage for the connected mode WTRUs and may change the cell's load. To support PLMN specific offloading, the X2 message for negotiating the handover trigger settings may be enhanced to support PLMN specific handover settings. For example, with the PLMN specific handover settings, the cell may have different coverage for each PLMN and may specifically adjust its load on a specific PLMN.

If the cell has PLMN specific coverage for connected mode WTRUs, but the same coverage for idle mode WTRUs, a WTRU may belong to a PLMN that has smaller coverage in the connected mode compared to the idle mode and may trigger a handover or another round of load balancing immediately when it transits to a connected mode. This may cause the waste of recourse in the cell and may confuse the SON algorithm by causing a short time stay problem. As disclosed herein, a method may be used to define PLMN specific coverage for an idle mode WTRU.

Resource monitoring may be provided. The RAN sharing resource monitoring use case may relate to the situation of a RAN operator that may share some portion of its RAN capacity with other hosted operators (e.g., MVNOs) and where the sharing arrangement may be different per each hosted operator. In such a scenario, the RAN operator may provide means to the requesting hosted operators to be informed about the status of the shared RAN resources allocated to that hosted operator as well as unallocated on-demand resources available for reservation. The RAN operator may regularly and/or on-request report to the hosted operators with respect to the RAN sharing status.

The RAN operator may be able to provide to hosted operators regular updates regarding the RAN sharing progress through a report. The RAN operator may be able to respond to on-demand updates regarding the RAN sharing progress through a report. The hosted operators may be able to verify fulfillment of the RAN sharing agreement through a report. The hosted operators may be able to initiate actions (e.g., load balancing, additional capacity negotiation, etc.) in response to the monitoring information.

Resource management may be provided at the RAN node. When resource sharing is dedicated and allocated, different network nodes, e.g., RAN nodes, may need to be informed about the resource sharing percentage or appropriation between different operators so that RAN resources may be shared according to the same allocation. Accordingly, procedures or methods may be defined to inform a RAN node about the resource allocation between different operators.

Once the RAN node has information regarding the resource division between more than one operator, the RAN node may ensure that the average amount of resources being used at a RAN may not exceed the appropriation that is decided among the operators. To ensure this, a shared RAN element may perform an accounting of network resource usage, e.g., at all times, separately for each RAN sharing partner. An accounting procedure may be defined at the RAN node so that the resource allocation agreement is not violated.

When the RAN node is operating close to its capacity, e.g., close to its allocated resources, admission of a new bearer may violate the sharing agreement between two or more operators. Policies and/or procedures may be used at the RAN node to avoid such a scenario. The RAN node may therefore accept a bearer based on such policies and/or procedures, and it may reject certain bearers if accepting them may violate the sharing agreement among the RAN operators. Such policies and/or procedures may be described such that a violation scenario does not occur.

The example operator virtualization architecture illustrated in FIGS. 5A-5B may be an example implementation of a virtual network architecture in which different RAN operators and service providers may be virtualized and the WTRU may be able to access or operate on any operator network that is part of the virtual cloud as disclosed herein.

FIGS. 5A-5B show a RAN layer of group NBs and eNBs belonging to different networks but operating together as part of a virtual network. These eNBs may have a certain allocation that may be reserved for virtual network operation. In some cases, the whole eNB from a particular network may be used for virtual network operation. It may not be clear how the virtual network eNBs or RAN nodes may perform dynamic capacity allocation, capacity brokerage, resource monitoring, and/or load balancing. These nodes may be controlled by a common virtual network resource controller, which may allocate or appropriate some or all of the RAN resources in a virtual network.

A cloud architecture that may expose APIs at one or more levels of the cloud, e.g., at the RAN level, the CN level, and/or at the high layer service level is shown in FIGS. 5A-5B. A RAN provider cloud 506 may include a cloud controller 508 and a data center 510, which may interact with a RAN layer 512 of the virtual network. These nodes may take over some of the processing from the RAN node, e.g., eNBs, HeNBs, NBs, etc., and may centrally perform the processing of the data. The RAN provider cloud 506 may interact with the RAN layer 512 to implement a virtualized RAN, and certain RAN functions may be outsourced to the RAN provider cloud 506.

Figure 8:
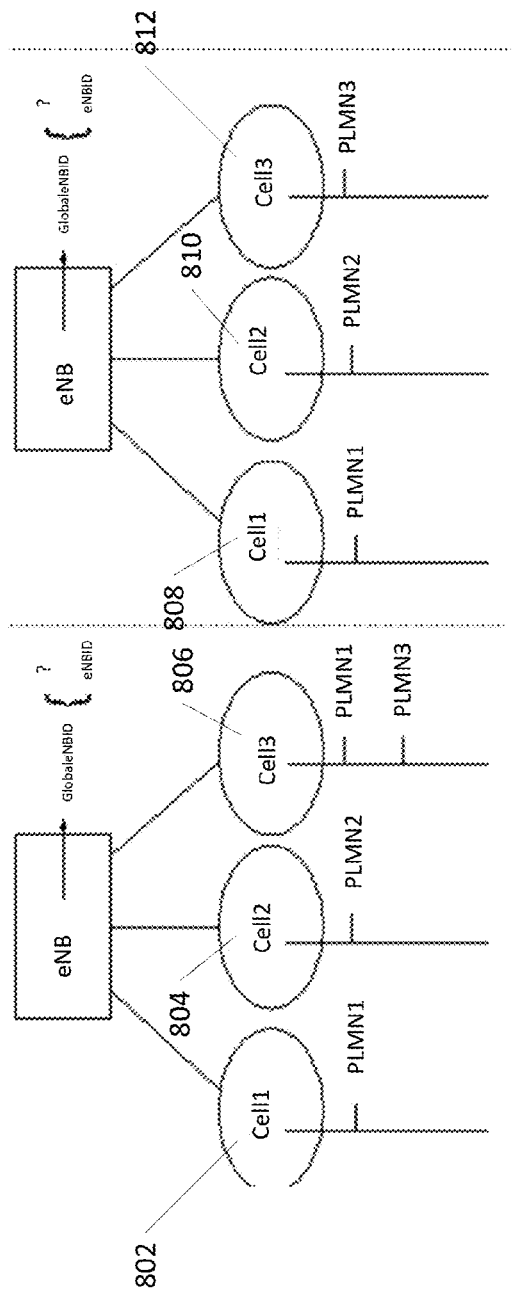
FIG. 8 is a diagram illustrating an example global eNB ID/E-UTRAN Cell Global ID (ECGI) confusion scenario.

There may be RAN sharing scenarios in which multiple cells belonging to the same eNB may be shared in such a way that it may cause confusion as to which PLMN ID may be included in the Global eNB ID and E-UTRAN Cell Global Identifier (ECGI). This may cause global eNB ID/ECGI confusion. FIG. 8 depicts example global eNB/ECGI confusion scenarios.

The same PLMN ID, e.g., the first one in the broadcasted PLMN ID list (Primary PLMN ID), may be included in a Global eNB ID and ECGI. In the example scenarios shown in FIG. 8, however, it may not be known which PLMN ID may be selected in the Global eNB ID as each cell 802, 804, 806; or 808, 810, 812 may be broadcasting a different PLMN ID. If different PLMN IDs may be filled in the Global eNB ID and ECGI, network elements may not know which eNB a cell belongs to.

This situation may affect the handover procedure. When an eNB sends the S1-AP handover message to the MME, it may include the Global eNB ID of the target eNB in the Target ID IE in the case of LTE to LTE handover. The MME may use this Global eNB ID to route the handover messages to a target eNB. If different PLMN IDs may be included in this message, the MME may not know which target eNB to forward the handover message to. Methods disclosed herein may be used to avoid such confusion when cells belonging to the same eNB broadcast different PLMN IDs.

Network sharing capacity brokerage architectures may be provided. As disclosed herein, there may be different possible architectures for requesting resources from a RAN operator.

Figure 9:
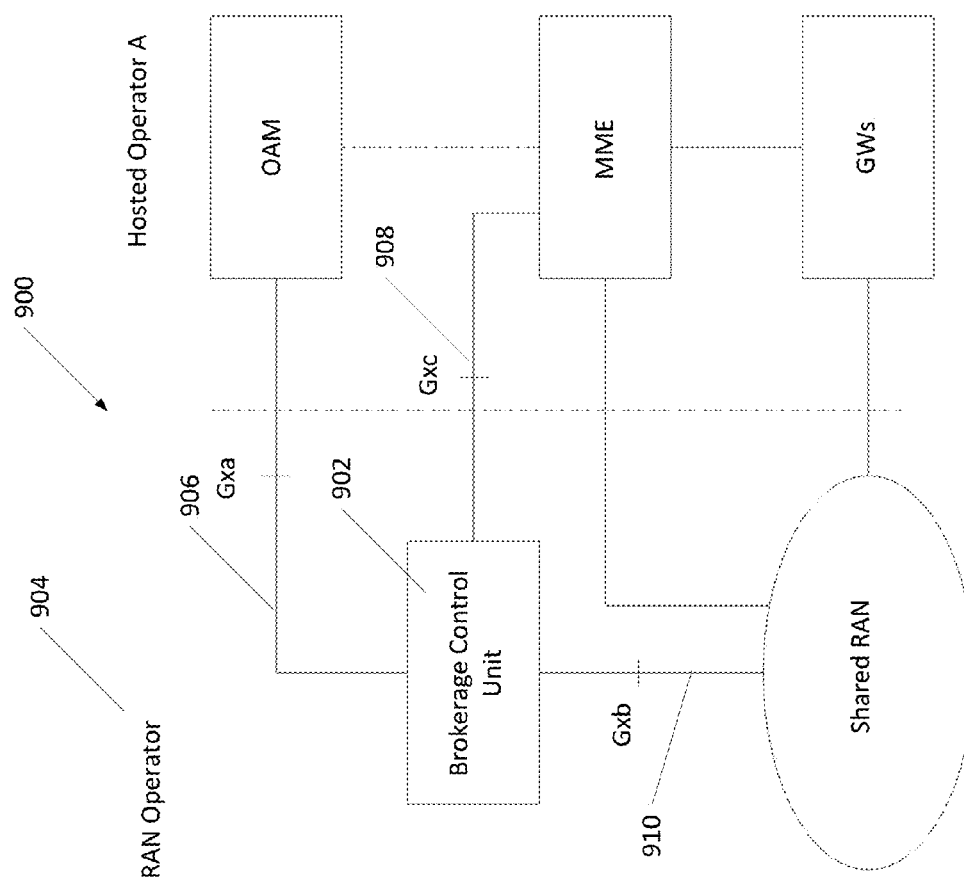
FIG. 9 is a diagram illustrating an example architecture for capacity brokerage.
Figure 10:
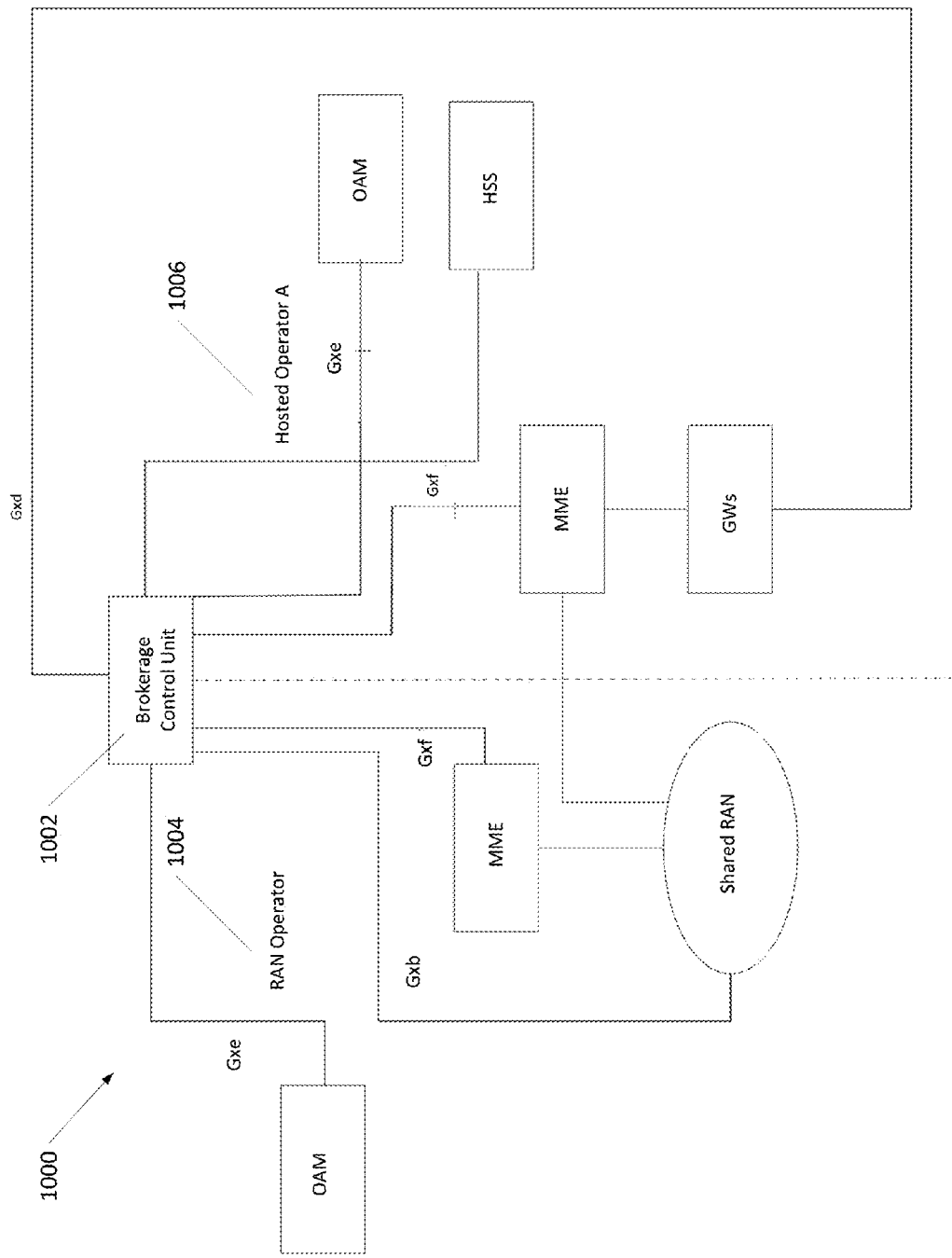
FIG. 10 is a diagram illustrating another example architecture for capacity brokerage.
Figure 11:
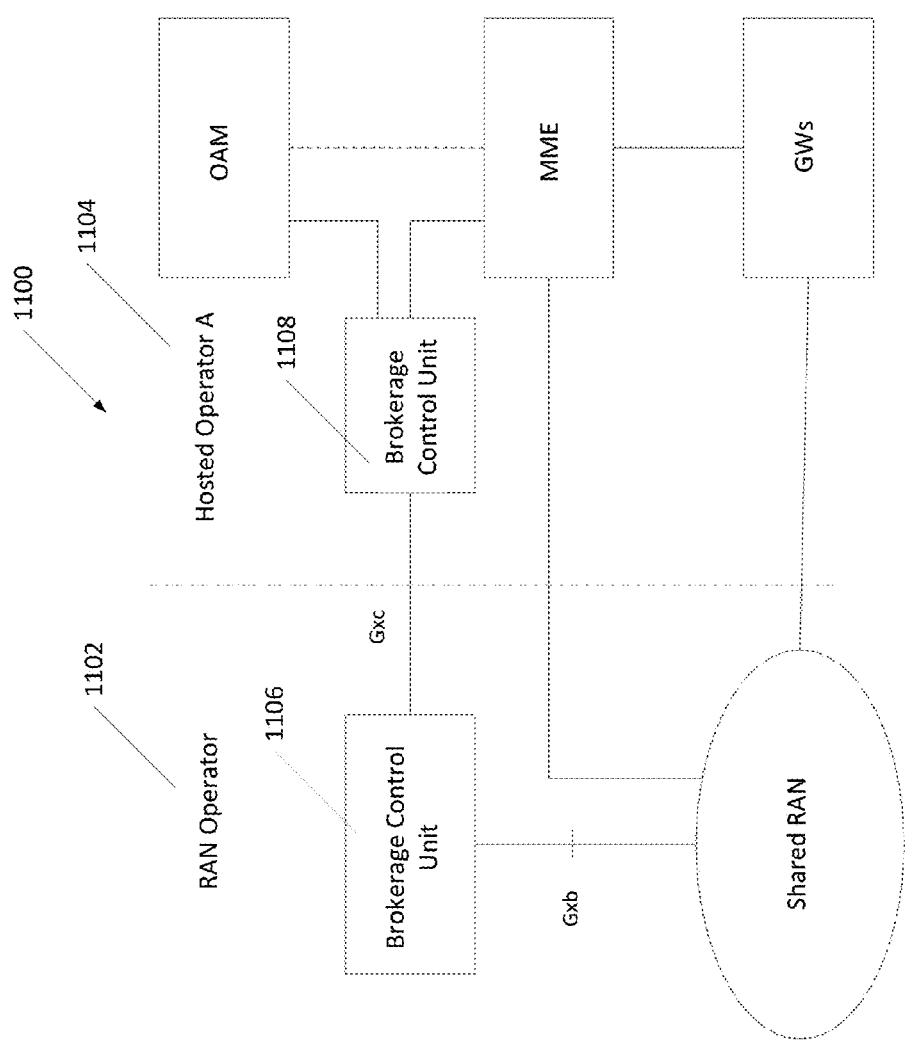
FIG. 11 is a diagram illustrating another example architecture for capacity brokerage.

FIG. 9 illustrates an example architecture 900 for capacity brokerage. FIG. 10 illustrates another example architecture 1000 for capacity brokerage. FIG. 11 illustrates yet another example architecture 1100 for capacity brokerage.

In the example architecture 900 of FIG. 9, a Brokerage Control Unit (BCU) 902 may be a logical node that may be responsible for managing capacity among different operators. A RAN operator 904 may implement the BCU 902, as shown in FIG. 9.

In the example architecture 1000 of FIG. 10, a master BCU 1002 may be used to serve operators 1004, 1006 that are sharing a RAN.

In the example architecture 1100 of FIG. 11, each operator 1102, 1104 may have its own BCU 1106, 1108. The BCUs 1106, 1108 may negotiate with each other to manage RAN capacity among the operators 1102, 1104 that may be sharing RAN resources. The functionalities of a BCU 1106, 1108 may include receiving a query, such as allocation requests from the hosted operators. A BCU 1106, 1108 may be able to send a query, such as an allocation result, to the hosted operators. A BCU 1106, 1108 may be able to negotiate different resource parameters among operators, such as time for which the resources may be needed, quantity of resources, and/or other service attributes, such as QoS, etc. The functionalities of a BCU 1106, 1108 may include arbitrator functionalities in case of multiple operators requesting a limited resource. For example, a BCU 1106, 1108 may decide which operator gets a share of the limited resources, as well as the size of the share. A BCU 1106, 1108 may be configured to collect available resource information from a shared RAN. A BCU 1106, 1108 may indicate a shared RAN that may enforce a resource reservation. A BCU 1106, 1108 may provide usage statistics for charging. A BCU 1106, 1108 may be able to charge hosted operators for RAN resources that may be used. A BCU 1106, 1108 may broadcast available resources to different operators periodically. A BCU 1106, 1108 may provide security and/or integrity parameters to ensure that resources may be allocated to an authorized operator.

Figure 12:
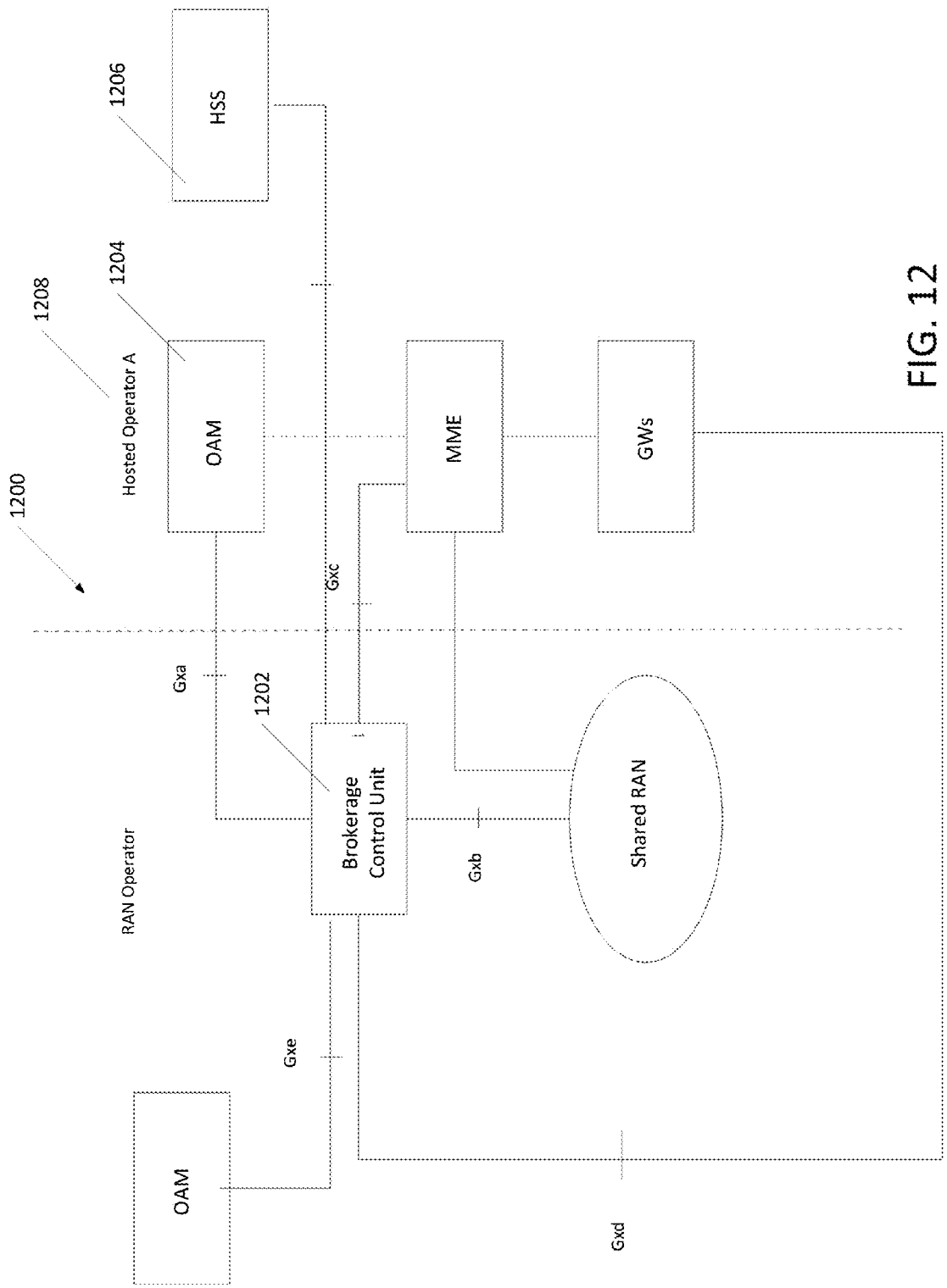
FIG. 12 is a diagram illustrating another example architecture for capacity brokerage.
Figure 13:
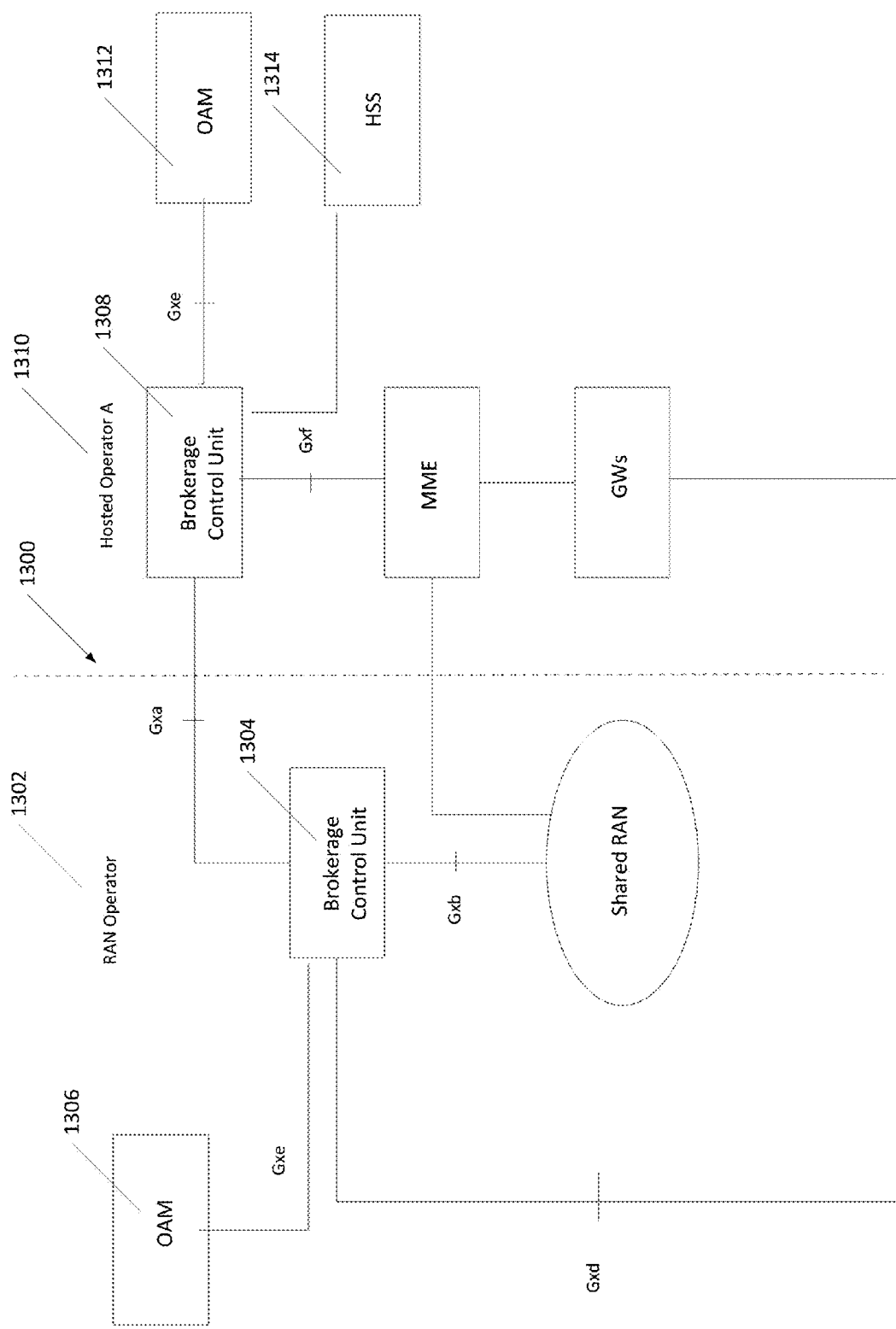
FIG. 13 is a diagram illustrating another example architecture for capacity brokerage.
Figure 14:
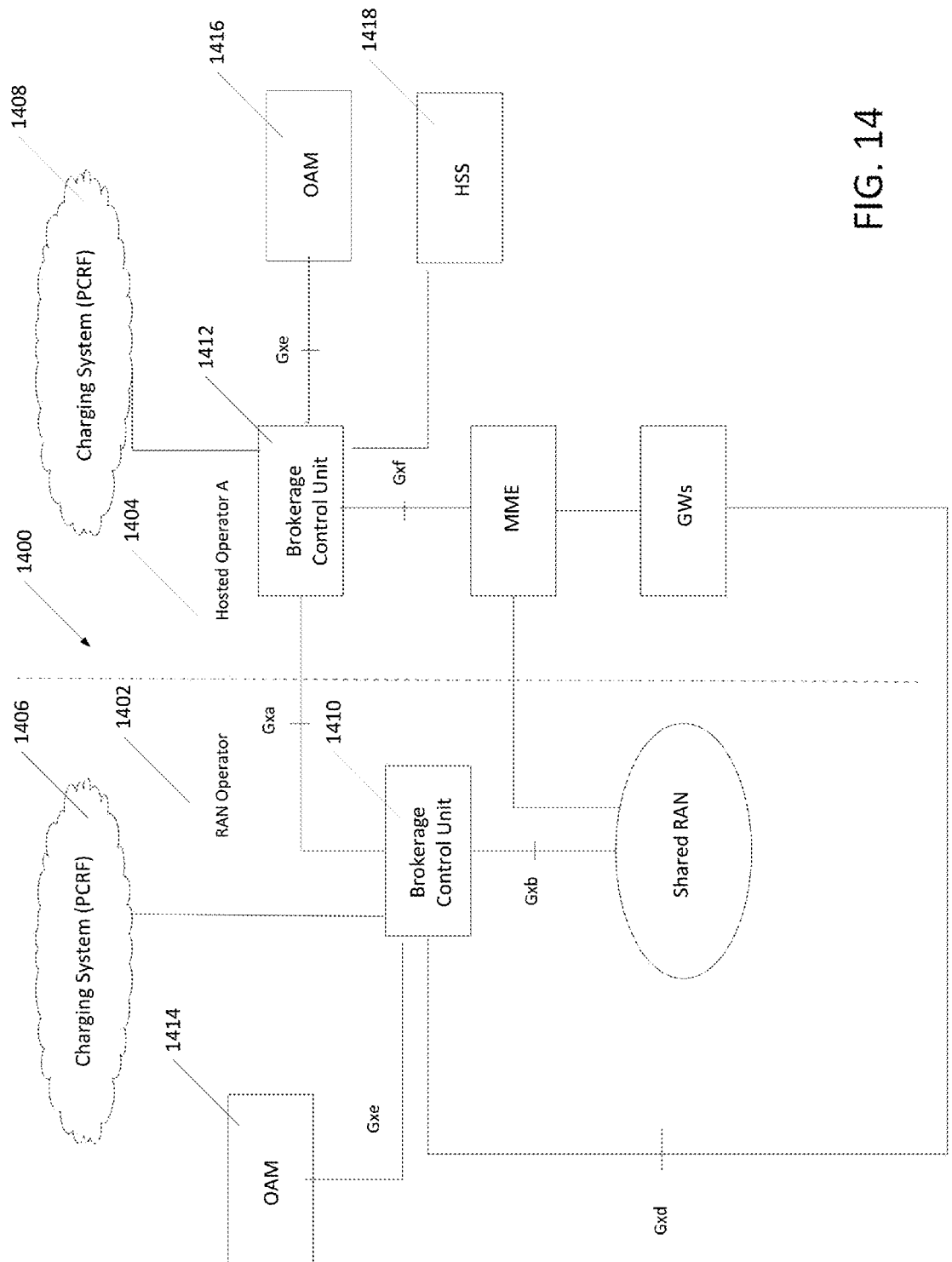
FIG. 14 is a diagram illustrating another example architecture for capacity brokerage.

FIGS. 12, 13, and 14 show other example architectures 1200, 1300, and 1400 with respective BCUs and their interfaces with different network nodes. These network nodes may include combinations of HSS, PCRF, MME, RAN, and/or OAM nodes, as well as other nodes. For example, as shown in FIG. 12, a BCU 1202 interfaces with an OAM node 1204 and an HSS node 1206 of a hosted operator 1208. As shown in FIG. 13, a RAN operator 1302 includes a BCU 1304 that interfaces with an OAM node 1306 of the RAN operator 1302 and with a BCU 1308 of a hosted operator 1310. The BCU 1308 interfaces with an OAM node 1312 and an HSS node 1314 of the hosted operator 1310. FIG. 14 illustrates an architecture 1400 in which a RAN operator 1402 and a hosted operator 1404 have respective PCRF nodes 1406, 1408 for use with a charging system. BCUs 1410, 1412 interface with these PCRF nodes 1406, 1408, as well as with OAM nodes 1414, 1416 and an HSS node 1418.

As disclosed herein, a BCU may be a logical node. This functionality may reside in different physical network nodes. BCU functionality may be part of one or more network nodes, or a combination of network nodes. For example, BCU functionality may be part of an MME, and communication between different BCUs may use the S10 interface between the MMEs. The BCU may be part of an eNB, and the X2 interface may be used for communication between different BCUs. The BCU may be part of an HSS, and an interface between two HSSs may be used for BCU communications.

The BCU may be a physical standalone node in an operator network. It may communicate with network nodes, and interfaces may be provided to assist BCU communications with nodes. Examples of these interfaces are shown in FIG. 9 and FIG. 10.

There may be an interface Gxa 906 between a BCU 902 and an OAM node of a requesting operator. The OAM node may send queries and/or allocation requests via this interface and may receive results semi-statically or dynamically.

There may be an interface Gxc 908 between the MME of the requesting operator and the BCU 902. The MME may have the information of the number of the registered WTRUs and their traffic. Based on this information, the MME may dynamically request capacity through this interface. This interface may also be used for BCU to BCU communication in the case in which each network employs a BCU node, such as shown in FIG. 11.

An interface Gxb 910 between the BCU and the shared RAN may be a proprietary interface. The BCU may collect resource information from the RAN and may request the RAN to enforce the allocation via this interface.

Units may be provided for network capacity allocation. A channel may be defined as a means of one-way connection between a transmitter and a receiver. A channel may be a downlink channel or an uplink channel. A bearer may be defined as IP packet flow with a defined Quality of Service (QoS) requirement. As used herein, the terms bearer, channel, and bearer channel may be used interchangeably.

On a user plane, a bearer channel may be described by a number of QoS characteristics, including, for example, a resource type (e.g., guaranteed bit rate (GBR) bearer vs. non-GBR bearer), priority, packet delay budget, and/or packet error loss rate.

For example, in LTE, the QoS concept may be class-based, where each bearer may be assigned a QoS class identifier (QCI) that may be characterized by a quadruplet (resource type, priority, packet delay budget, and packet error loss rate).

The QCI may specify user plane treatment of a bearer. The allocation and retention priority (ARP) may specify control plane treatment that the bearer receives. For example, the ARP may be used in the control plane to decide whether a bearer establishment or modification request may be accepted or may be rejected due to resource limitations. Further, the ARP may be used to decide which bearer to release during a resource limitation.

Additionally, the non-GBR bearers may be controlled by aggregate maximum bit rate (AMBR) to enable the operators to limit the total amount of bit rate consumed by a subscriber. An AMBR may be defined on a per-group of non-GBR bearers basis. For example, APN-AMBR may be defined per subscriber and per APN, and Terminal AMBR may per subscriber.

On the radio interface, the bearer channels may be mapped to network resources in one or more of the following domains: frequency, time, space and/or code. Furthermore, different modulation and coding scheme (MCS) as well as a number of transmission layers may be used. For example, in LTE, a physical resource element (PRE) may be defined as a subcarrier over an OFDM symbol duration. The frequency domain may be divided into subcarriers, while the time domain may be divided into frame (10 ms), slot (0.5 ms), and symbols. A physical resource block (PRB) may consist of 12 subcarriers during 0.5 ms time slot (half-subframe), e.g., 84 resource elements (normal cyclic prefix) or 72 resource elements (extended cyclic prefix). Although resource blocks may be defined over a slot, the basic time-domain unit for dynamic scheduling may be a subframe consisting of two consecutive slots.

A number of metrics may be used individually or in any combination to express the network capacity and the network slice allocation to hosted operators. One metric may be a number of GBR bearers that may be available, or a percentage of the total GBR bearers that may be available for each defined GBR data rate, QC1, and ARP (downlink, uplink). Another metric may be a number of non-GBR bearers that may be available or a percentage of the total non-GBR bearers that may be available for each defined non-GBR data rate, QC1, and ARP (downlink, uplink). Another metric may be a number of APN-AMBR (or APN-AMBR-Subscriber) (downlink, uplink) for each APN or APN type or a percentage of the total number of APN-AMBR that may be available for each APN or APN type. APN-AMBR may be per subscriber, hence the notation APN-AMBR-Subscriber. For example, a hosted operator may be allocated two million APN-AMBR of 54 MBps non-GBR for an APN that may correspond to an on-demand movie service. The hosted operator may then serve two million subscribers, assuming each subscriber may have one PDN connection to that site at a time. Alternatively, if the network being shared may support ten million subscribers at that AMBR data rate, then the same allocation expressed as a percentage may be 20%. Another metric may be a number of terminal-AMBR (downlink, uplink) or a percentage of the total terminal-AMBR that may be available. Another metric may be a number of PDN connections or a percentage of the total PDN connections that may be available. Another metric may be a number of available GBR PRB or a percentage of the total GRB PRB (downlink, uplink). Another metric may be a number of available GBR PRE or a percentage of the total GRB PRE (downlink, uplink). Another metric may be a number of available non-GBR PRB or a percentage of the total non-GRB PRB (downlink, uplink). Another metric may be a number of available non-GBR PRE or a percentage of the total non-GRB PRE (downlink, uplink). Another metric may be a total number of PRB or a percentage of the total number of PRB. Another metric may be a total number of PRE or a percentage of the total number of PRE. Another metric may be a frequency band (or bandwidth within a given frequency band or number of subcarriers) or a percentage of an available frequency band. Another metric may be a time period, e.g., a slot, subframe, or frame, a time period of the day in seconds, minutes, or hours, or defined by a starting point and an endpoint. Another metric may be a code, e.g., a percentage of available codes or a number of codes. Another metric may be a number of transmission layers, e.g., transmission layers per cell. Another metric may be a number of access preambles or a percentage of the available access preambles. Another metric may be a number of control channel elements or a percentage of the available control channel elements. Another metric may be an average number of WTRUs that may be in a connected mode at any given time and the average amount of data that may be transferred by those WTRUs or the percentage of the total number of WTRUs that may be in the connected mode at a given point in time. Another metric may be a total number or percentage of WTRUs that may be in the cell and the number or percentage of EPS bearers per WTRU or the total number of bearers in the cell. This information may also include the QCI of the bearers. Another metric may be a number or percentage of IP addresses or MSISDN or URI or any other terminal or application addresses.

Call/Session drop rate may be used as part of measuring deviation from promised capacity. Call/Session drop rate may include aggregate drop rate, per GBR bearer and per QCI, per non-GBR bearer and per QCI, per APN, per terminal (or per user), or the like or any combination thereof. Call/Session Attempt failure rate may include aggregate failure rate, per GBR bearer and per QCI, per non-GBR bearer and per QCI, per APN, per terminal (or user), or the like or any combination thereof. Handover attempt failure rate may be used as part of measuring deviation from promised capacity. Handover attempt failure rate may include aggregate failure rate, per GBR bearer and per QCI, per non-GBR bearer and per QCI, per APN, per terminal (or user), or the like or any combination thereof.

The metric or combination of metrics used may depend on the network sharing deployment scenarios and agreements. For example, for a network sharing scenario in which the network owner may be in charge of the network operation, the network capacity allocation may be based on four metrics, such as the number of GBR bearers that may be available, the number of non-GBR bearers that may be available, the number of APN-AMBR, and/or the number of terminal-AMBR. Similarly, for a network sharing scenario in which hosted operators manage and control the behavior of the network, the network capacity allocation may be expressed in terms of a PRB metric or a combination of any or some of the above metrics, e.g., PRB metric(s), PRE metric(s), frequency band, time period, code, and/or number of transmission layer metrics. This may also be performed where the sharing framework may allow configuration and/or management of the network according to hosted operator configuration preferences.

Dynamic resource sharing may be performed. A method or methods may be provided to allow a hosted operator to identify resources that may be needed. A hosted operator may monitor different parameters in its network to identify whether more resources may be needed. These parameters may be on a per eNB basis or a group of eNBs that may serve WTRUs in a region. These eNBs may send these parameters to a logical entity in the network periodically or may send these parameters when requested by a network node. The eNBs may exchange these parameters among themselves, e.g., via an X2 interface.

A hosted operator RAN may identify if more resources may be needed by analyzing one or more parameters, such as a physical radio resource, a data rate, a bit rate, an average number of WTRUs that may be in a connected mode, a total number of WTRUs that may be in a cell, an average number of incoming and outgoing handover requests, the types of applications being run on a WTRU, a number of roaming WTRUs that may be in the network, or the like, or any combination thereof.

A hosted operator RAN may identify if more resources may be needed by analyzing physical radio resources that may be used by different WTRUs in an eNB or a group of eNBs. These resources ay include an access preamble, a control channel element, a PRB or PRBs of PDSCH/PUSCH, PUCCH resources, or the like.

A hosted operator RAN may identify if more resources may be needed by analyzing a data rate or a bit rate, which may be an aggregated bit rate in PDCP/RLC, a make level, and/or a bit rate provided to each WTRU under the coverage of that eNB.

A hosted operator RAN may identify if more resources may be needed by analyzing an average number of WTRUs that may be in a connected mode at a given time and an average amount of data transferred by those WTRUs.

A hosted operator RAN may identify if more resources may be needed by analyzing the total number of WTRUs in a cell and the number of EPS bearers per WTRU or the total number of bearers in the cell. This information may also include the QCI of the bearers.

A hosted operator RAN may identify if more resources may be needed by analyzing the average number of incoming and outgoing handover requests for a given amount of time. If the amount of incoming handover requests is greater than the amount of outgoing handover requests, the hosted network may trigger a request for more resources.

A hosted operator RAN may identify if more resources may be needed by analyzing types of applications being run on WTRUs in a given cell. The granularity of the types of applications may be voice or non-voice applications, or it may be at an even higher granularity, e.g., video, interactive, social networking, gaming, etc.

A hosted operator RAN may identify if more resources may be needed by analyzing a number of roaming WTRUs in the network.

Methods may be used by the hosted operator to request resources. The hosted operator may request resources from the RAN operator using, for example, a manual model and/or an automatic model. In a manual model, the requesting operator may know in advance when and how much resources it may need and may request the capacity allocation via OAM procedures. This may also be a semi-static model. In this model, the additional capacity may be negotiated between different operators based on agreements between different operators. The operators may use the architecture to request more capacity or cancel capacity assigned to the hosted operator. In an automatic model, the hosted operator network may determine automatically using, for example, a method disclosed herein, that the RAN resource may not be enough and may send a request to the hosting operator to allocate more resource. This may be a fully dynamic model.

The hosted operator may use the architectures disclosed herein to request resources from the RAN operator. The hosted operator may discover available RAN operators that may be able to offer resources. This discovery may be performed using one or more of the methods disclosed herein.

Discovery may be performed using OAM procedures. The hosted operator may have an agreement with the RAN operator. The hosted operator may receive the destination address (e.g., transport layer or IP address, etc.) of the BCU through its agreement so that it may contact the BCU of the RAN operator when it may need additional resources.

Discovery may be supported by HSS. The hosted operator may query its HSS to find information that may include the address of the RAN operator. The HSS may respond with one or more available RAN operators. The BCU may then decide to contact these operators to request resources.

Discovery may be performed by a discovery server. The discovery server may have a database of available RAN operators willing to offer RAN resources to the MVNOs or hosted operators. The hosted operator may contact the discovery server to receive information about the RAN operators, such as the address information.

After discovering the RAN operator, the hosted operator may query the RAN operator for the available resources. This may be performed by sending a query message, e.g., "Capacity Query Request" or a similar message to the RAN operator or the BCU of the RAN operator. The architectures shown in FIGS. 9-14 may be used to send the query message.

Figure 15:
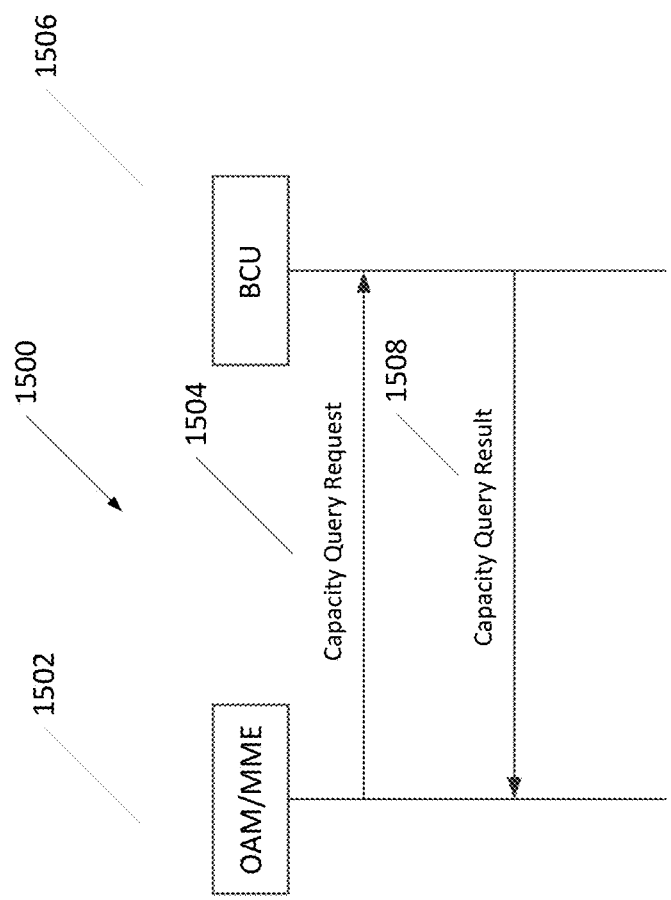
FIG. 15 is a diagram illustrating an example capacity query procedure message exchange between a hosted operator and a RAN operator.

FIG. 15 depicts an example message exchange 1500 between a hosted operator and a RAN operator. As shown in FIG. 15, an OAM/MME node 1502 may also be another BCU node, e.g., the hosted operator BCU. As shown in FIG. 15, the hosted operator may send the Capacity Query Request 1504 to the RAN operator, e.g., to a BCU 1506 of the RAN operator. This message may include an identification of the hosted operator (PLMN_ID), locations (cell_id_list, etc.), type of request (periodic or one-time request), available resource type (e.g., those disclosed herein), time period for which the resources may be needed, current usage, QoS of required resources, or the like, or any combination thereof.

Upon receiving the request, the BCU 1506 may consider the parameter included in the request message and may reply with a Capacity Query Result 1508 or available resource status. The Capacity Query Result may include a transaction ID, a type of available resource response (periodic, answer to the request, etc.), an identification of the requesting operator (PLMN_ID), locations (cell_id_list, etc.), a list of available resource types, a quantity of the available resource (s), a QoS attribute of the available resource(s), a time period of each of the available resource(s), a parameter to identify whether or not the hosted operator may use each of the available resource(s), a maximum percentage of the cell or resource the hosted operator may be allowed to use, a charging parameter and the rate(s) of the available resource (s), or the like, or any combination thereof.

Upon receiving the Capacity Query Request 1504, the BCU 1506 may trigger the configuration or reconfiguration of the network nodes selected consistently with the latest allocated network capacity. The BCU 1506 may send the Capacity Query Result 1508 after the configuration of the affected nodes.

In some cases, the BCU 1506 may not trigger the configuration or reconfiguration of the network nodes selected. The OAM/MME 1502 of the BCU node in the hosted operator may then configure the allocated resources in the relevant network nodes upon receiving the Capacity Query Result 1508 message. The Capacity Query Result 1508 may include the identities of the network nodes allocated to the hosted operator.

A method or methods may be used at the RAN operator to grant resources. When the hosted operator receives information about available resources periodically or as a response to a request sent by the BCU, the network elements may use the information about the available resources to create a request for resource message to the RAN operator. Depending on the network configuration, the agreement between the operator, and/or other factors, the request for the resource message may be sent when the resources may be needed. The hosted operator may also send the request some time in advance. Upon receiving the request from the hosted operator, the RAN operator may or may not grant resources to the hosted operator. If the RAN operator grants resources to the hosted operator, it may grant part of the requested resources. The status of the available resources may have changed since the last time the hosted operator received the Capacity Query Result 1508 or similar message. In this case, when the hosted operator receives the resource allocation request and the allocation request is inconsistent with the status of the available resources, it may reject the allocation request and may send the available resource status or Capacity Query Result 1508 message of FIG. 15 to the hosted operator. The rejection may also indicate to the hosted operator that it may attempt the request again based on the new allocation status.

Figure 16:
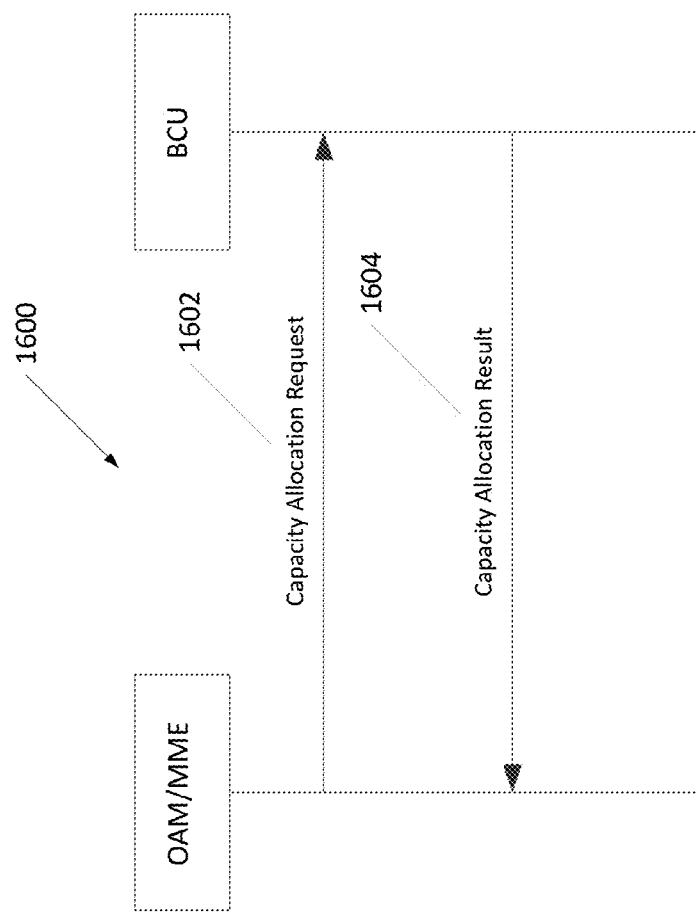
FIG. 16 is a diagram illustrating an example capacity allocation request and response procedure.

FIG. 16 depicts an example capacity allocation request/response procedure. FIG. 16 illustrates a capacity allocation request/response message exchange 1600 that may be used to ask for more resources from a RAN operator. The OAM/MME node illustrated may also be another BCU node, e.g., a hosted operator BCU. A Capacity Allocation Request 1602 may include one or more parameters or IEs, such as a transaction ID, an identification of the requesting operator (PLMN ID), a location or locations (cell_id_list, etc.), a type of the allocation request (emergency request, non-emergency request, carrier aggregation, etc.), a time when the resources may be required, an amount of time for which the resources may be needed, a requested resource type, a requested quantity of the resource, a QoS attribute, or the like. A Capacity Allocation Result or accept message 1604 may include one or more parameters, such as a transaction ID, a result (allocated, not allocated, partially allocated, etc.), a cell ID of the allocated resource, an allocated resource type, an allocated resource quantity, a QoS attribute, an allocated time period, a time when the hosted operator may start using those resources, whether the hosted operator may withdraw the resource, whether the RAN operator may withdraw the resource, information about other operators or PLMNs that may be sharing the same resource or pool of the same resource, or the like.

There may be a situation where the RAN operator may receive simultaneous requests from different hosted operators at the same time. In this competing situation, when multiple operators may request more than the available capacity in a period of time, the BCU may need to decide how to allocate the resource among the requesting operators. The requesting operators may be given different priorities, and there may be different operation to distribute the capacity according to the priorities. For example, the top priority party may get what it requested. If the rest may be more than what a second priority party requests, the second priority party may get what it requested. Otherwise, the second priority party may only get a remainder. As another example, each priority party may get an equal or fair amount of resource first, and the rest may be distributed in a priority order. As another example, each priority may be given a weight and the "requested priority * weight" may be allocated if the resource may be enough. As another example, priority may be based on the type of application for which the resources may be allocated.

Resources may also be allocated on a first-request-first-serve basis such that an earlier request may be satisfied first. If the operator follows this type of policy, there may be some exceptions to it. For example, there may be an exception when there may be an incoming request for emergency resource allocation.

Returning again to FIG. 15, upon receiving the Capacity Query Request 1504, the BCU may trigger the configuration or reconfiguration of the network nodes selected consistently with the latest allocated network capacity. The BCU may send the Capacity Query Result 1508 after the configuration of the affected nodes.

Alternatively, the BCU may not trigger the configuration or reconfiguration of the network nodes selected. The OAM/MME of the BCU node in the hosted operator domain may then configure the allocated resources in the relevant network nodes upon receiving the Capacity Query Result 1508 message. The Capacity Query Result 1508 message may also include the identities of the network nodes allocated to the hosted operator.

When the hosting operator has agreed to grant the resources sharing for a particular hosted operator, either as a result of static configuration or dynamic on-demand request, the hosting operator may add the PLMN identity of that participating operator in the broadcasted PLMN identity list to make that PLMN selectable for WTRUs. Similarly, if the hosting operator needs to stop the sharing for a particular operator, e.g., if the participating operator has used up the shared resources quota, it may remove the PLMN identity of that operator from the broadcasted PLMN identity list.

Figure 17:
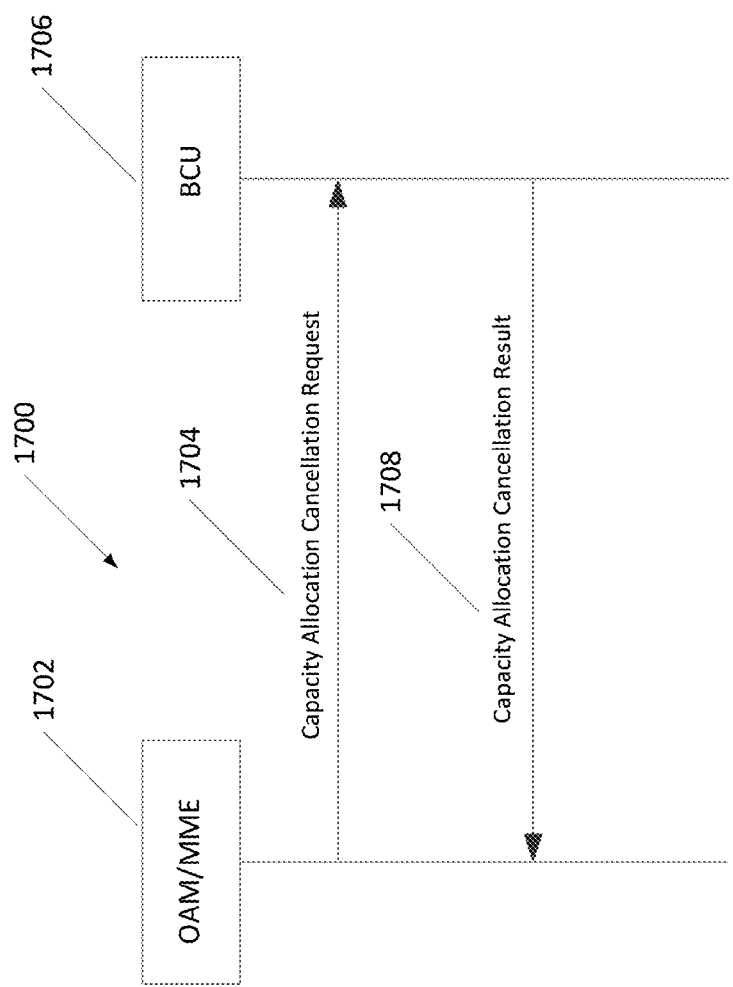
FIG. 17 is a diagram illustrating an example resource cancellation process initiated by a hosted operator.

A method or methods may be used to withdraw or cancel resources. Unused allocated resources may be cancelled or withdrawn by either the hosted operator or the RAN operator. The operator wishing to cancel the allocated resource may send a cancellation request to the other operator to withdraw the resources. The ultimate decision to cancel the resources may be taken by the RAN operator in either case. FIG. 17 depicts an example resource cancellation process 1700 that may be initiated by the hosted operator. In the process shown in FIG. 17, an OAM/MME node 1702 illustrated may also be another BCU node, e.g., the hosted operator BCU. The information carried in a capacity allocation cancellation request 1704 may include a transaction ID, an identification of the requesting operator (PLMN_ID), a location (cell_id_list, etc.), a resource type to be cancelled, a reason for cancellation, a quantity of the resource to be cancelled, a time period to be cancelled, a time the resources need to be cancelled, a parameter that may indicate how many resources may need to be cancelled, or the like, or any combination thereof. This message may also be used to modify the resource parameters, e.g., QoS, etc.

When the RAN operator, e.g., a BCU 1706 of the RAN operator, receives this message, it may reply with a Capacity Cancellation Result message 1708. The Capacity Cancellation Result message 1708 may include a transaction ID, an identification of the requesting operator (PLMN_ID), a location (cell_id_list, etc.), a cancellation result (e.g., accepted, not accepted, partially accepted, etc.), a cancellation charge or fee if any, or the like, or any combination thereof.

Figure 18:
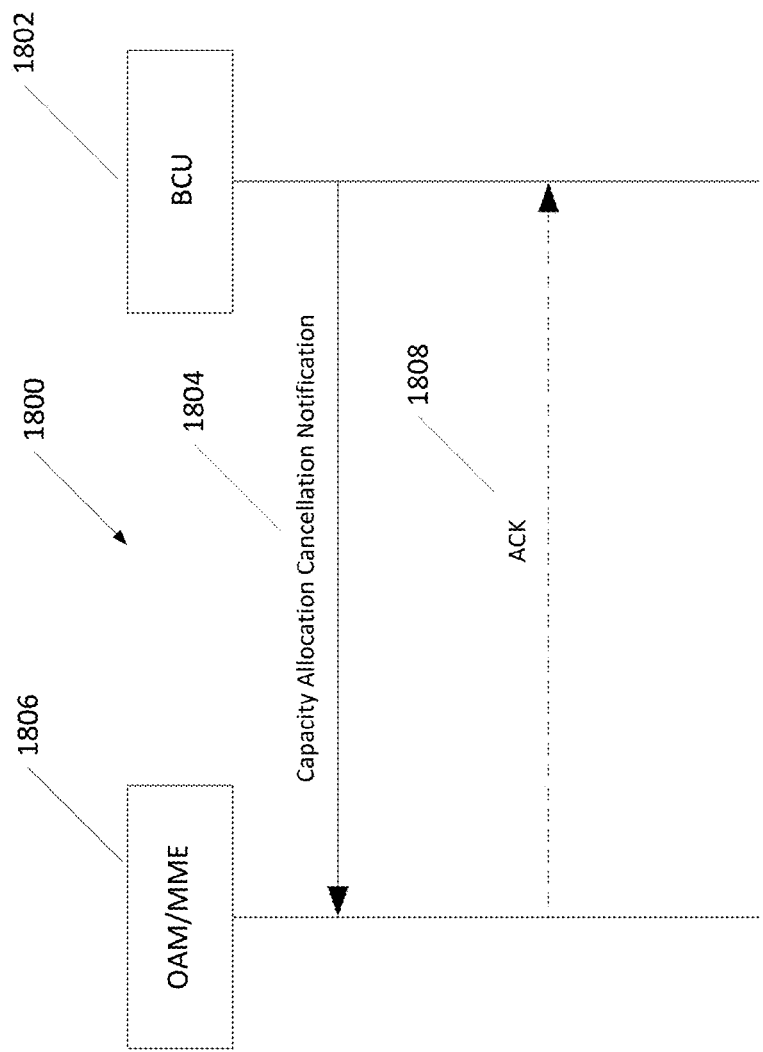
FIG. 18 is a diagram illustrating an example resource cancellation process initiated by a RAN operator.

FIG. 18 depicts an example resource cancellation process 1800 that may be initiated by the RAN operator. As disclosed herein, resources may also be cancelled by the RAN operator. As shown in FIG. 18, a BCU 1802 in the RAN operator may send a capacity allocation cancellation notification 1804 to the hosted operator, e.g., an OAM/MME node 1806 in the hosted operator, to cancel the unused allocated resources. The capacity allocation cancellation notification 1804 may include a transaction ID, an identification of the requesting operator (PLMN_ID), a location (cell_id_list, etc.), a reason for cancellation, a quantity of the resource to be cancelled, a time period to be cancelled, a time the resources need to be cancelled, a parameter that may indicate how many resources may need to be cancelled, a parameter that may indicate when the next resource request should be sent by the hosted operator, or the like, or any combination thereof. The capacity allocation cancellation notification 1804 may also be used to modify the resource parameters, e.g., QCI, QoS, etc. Upon receiving this message, the hosted operator may or may not send an acknowledgement (ACK) 1808 in response.

Upon receiving the Capacity Query request, the BCU may trigger the configuration or reconfiguration of the network nodes selected consistently with the latest allocated network capacity. The BCU may send the Capacity Query Result after the configuration of the affected nodes.

In another example, the BCU may not trigger the configuration or reconfiguration of the network nodes selected. The OAM/MME of the BCU node in the hosted operator domain may configure or reconfigure the selected nodes to be consistent with the latest resource allocation status.

In an example, the hosting RAN operator, e.g., a UTRAN hosting operator, may provide domain-specific network sharing to hosted or participating operators. Domain-specific network sharing may limit use of shared resources to a specific domain, e.g., CS domain only or PS domain only.

The domain-specific network sharing may be a PLMN-specific setting, e.g., for different participating operators it may have different settings (e.g., CS domain sharing only, PS domain sharing only, both CS and PS domain sharing, etc.), or the hosting RAN may use a common setting for all participating operators.

The hosting RAN may broadcast its domain-specific sharing settings in its system information. The broadcast settings may include information such as, for example, a common domain-specific setting for all participating operators or for those participating operators that do not have a PLMN-specific setting in this system information; and/or a list of PLMN-specific settings for some or all of the participating operators. Common or PLMN-specific settings may have options such as CS domain only sharing, PS domain only sharing, and/or both CS and PS domain only sharing.

Domain-specific sharing settings may be broadcast in SIB1, together with the PLMN identity list, so the WTRU can acquire the setting before it chooses the PLMN. Alternatively, the domain-specific sharing settings may be broadcast in other SIBs other than SIB1. The WTRU may choose a PLMN without knowing its domain-specific access limitation.

If the domain-specific sharing settings are broadcast in SIB1, the WTRU may consider these settings in a PLMN selection procedure. For example, a WTRU that is configured to use the CS domain for voice or SMS may not select a PLMN that is designated as PS domain only.

If the domain-specific sharing settings are broadcast in SIBs other than SIB1, the WTRU may choose a PLMN without regard to its domain-specific sharing settings. After camping in a cell, the WTRU may acquire the SIB that has the domain-specific sharing settings, and if it finds that the settings are not appropriate, it may reselect another PLMN or another suitable cell of the same PLMN; label the cell as barred; deprioritize the selected PLMN for a certain period of time (e.g., a timer may be started, and the PLMN priority may be restored when the timer expires); and/or label the PLMN as not available or not allowed for a certain period of time (e.g., a timer may be started, and the PLMN availability may be restored when the timer expires).

The domain-specific sharing settings may also change dynamically. The WTRUs may follow the normal system information update procedure to acquire new settings. If the new setting turns against a WTRU that already has an active connection, for example, from PS domain only sharing to CS domain only sharing when the WTRU is a PS-mode WTRU, the hosting operator may determine whether to continue to serve the WTRU or to disconnect the WTRU.

The participating operators may be aware of the sharing settings of the hosting operator, either by OAM configuration or by inter-system signaling exchange. The participating operator may consider the sharing settings when it tries to redirect the WTRU to the hosting RAN, e.g., for load balancing or for CS call fallback.

Figure 19:
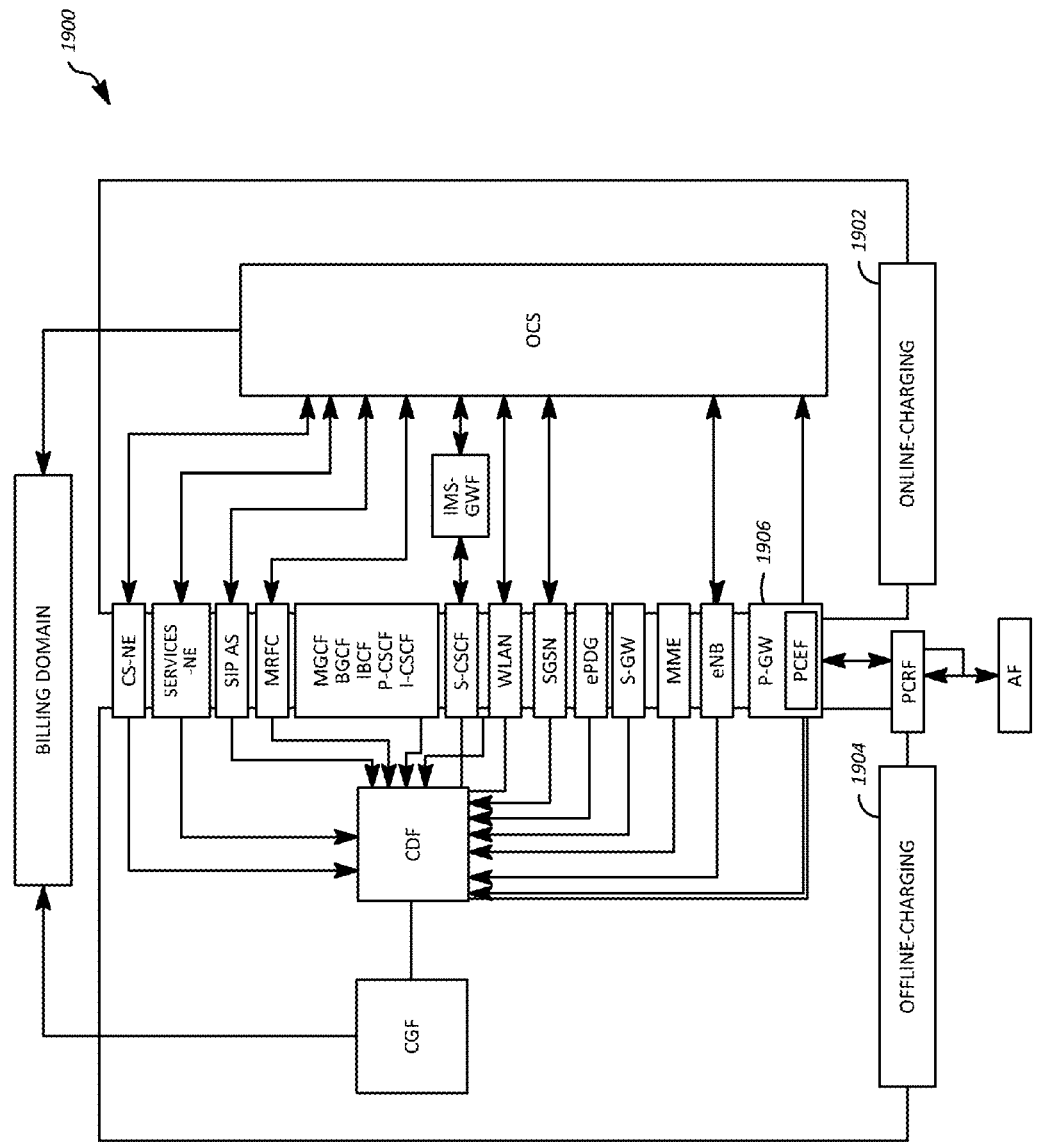
FIG. 19 is a diagram illustrating an example logical charging architecture.

FIG. 19 illustrates an example logical charging architecture 1900 and information flows for offline and online charging. Example charging functions are illustrated in FIG. 19 with interfaces to an online charging system 1902 and to an offline charging system 1904. An eNB or RAN subsystem 1906 may be employed in a virtualized or RAN sharing case. A RAN node or an eNB may trigger a charging event in either an online case or an offline case.

Figure 20:
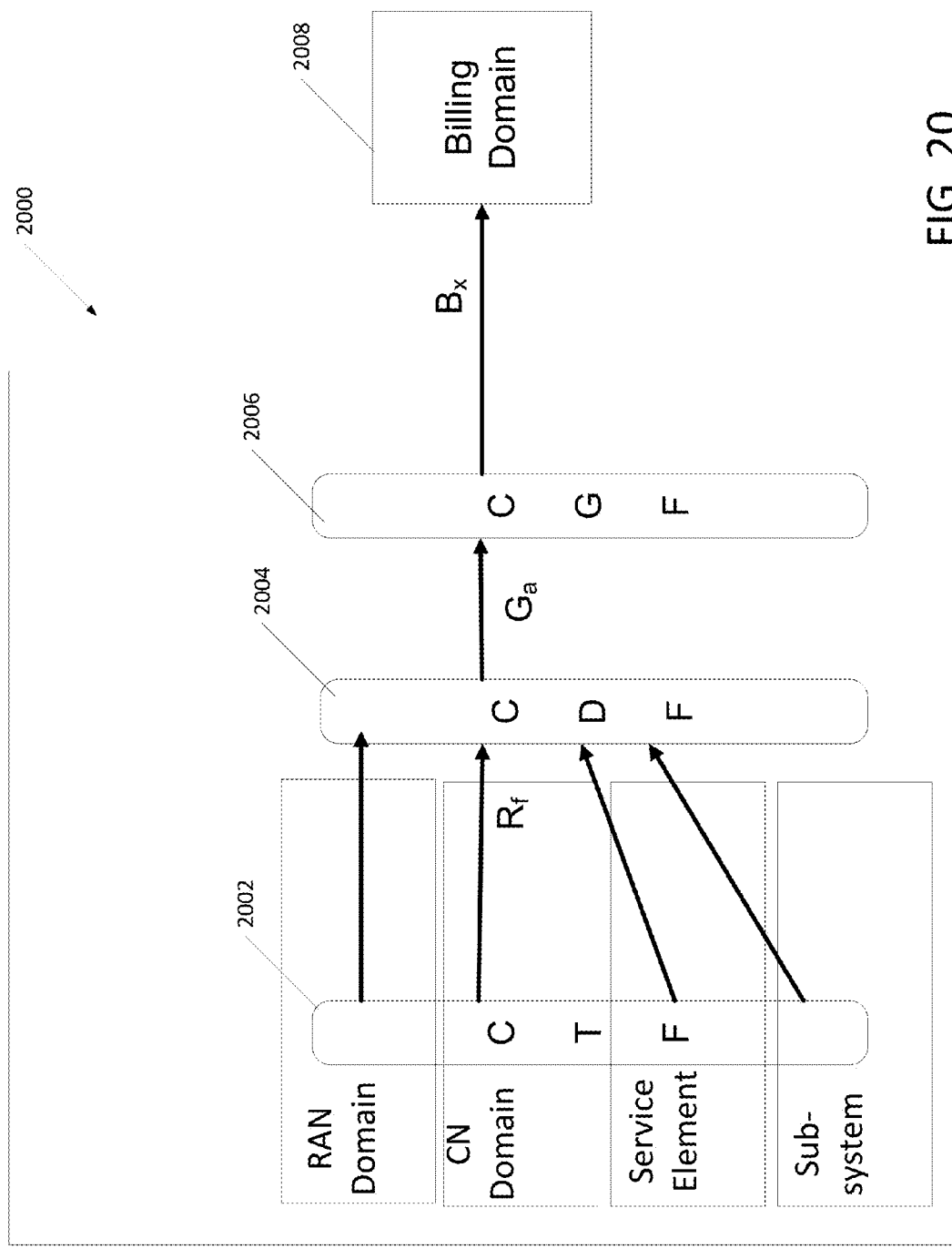
FIG. 20 is a diagram illustrating an example offline charging system.
Figure 21:
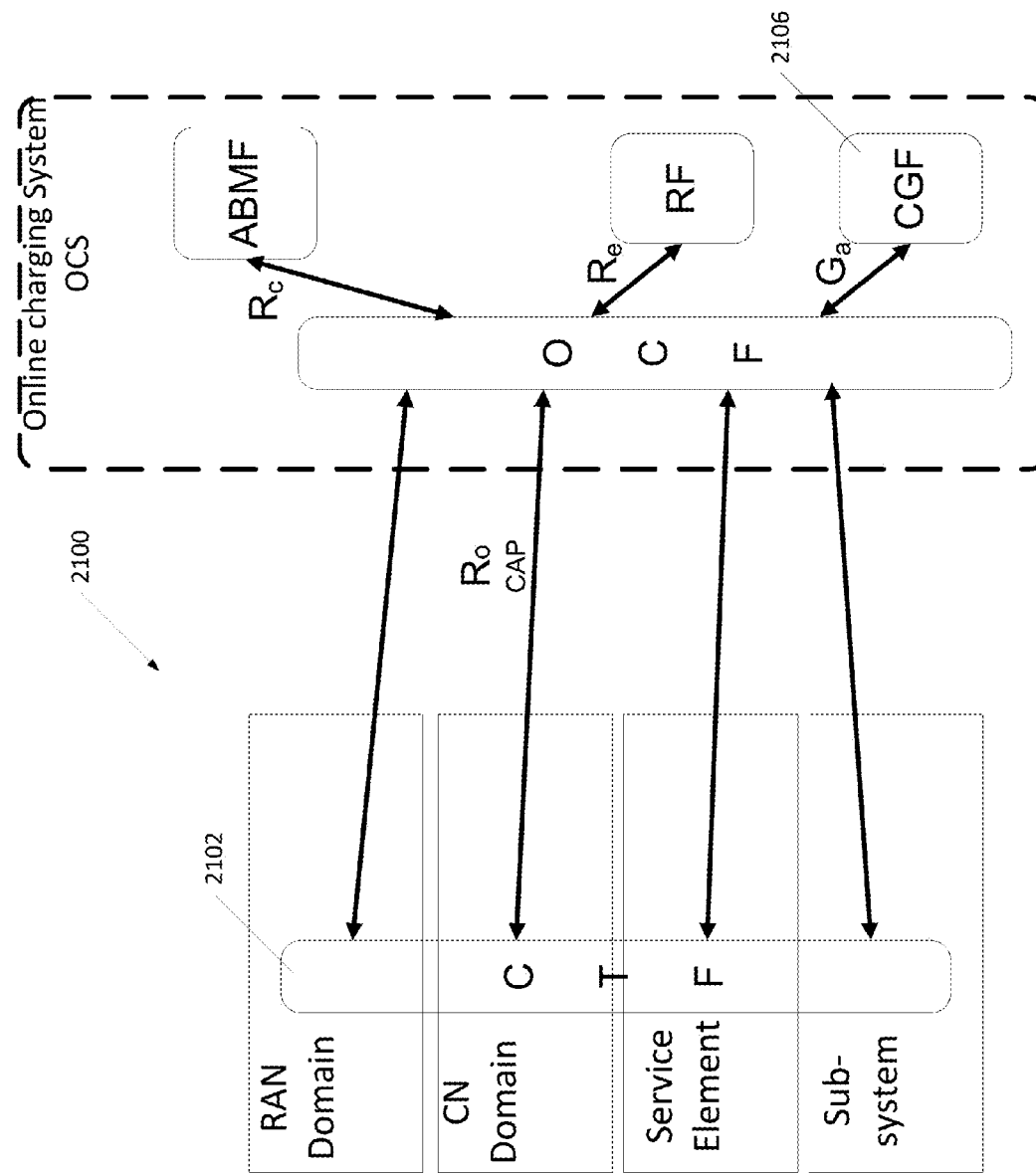
FIG. 21 is a diagram illustrating an example online charging system.

FIG. 20 and FIG. 21 illustrate an offline charging system 2000 and an online charging system 2100, respectively, with a RAN subsystem. In both systems, the RAN node may have a charging trigger function (CTF) 2002, 2102 and may generate charging events based on the observation of RAN resources and other network resources. These charging events may be sent directly by the RAN/eNB to a charging data function (CDF) 2004 that may produce charging records (CRDs), which may be sent to a charging gateway function (CGF) 2006, 2106. The CGF 2006, 2106 may have a direct interface to a billing domain 2008 for the offline charging system 2000.

When a hosted operator WTRU is handed over to a RAN operator, the RAN operator may perform a check whether the WTRU is being handed over from the hosted operator cell, or the RAN operator may check to determine whether a charging event needs to be triggered. The charging event may not be triggered, for example, if the handover is an intra-RAN operator seamless handover.

This check may be performed before the handover. The source eNB may receive measurements that may include the ECGI of the target eNB. The source cell may know from the PLMN ID contained in the ECGI whether the target cell belongs to the same operator or not. If the source cell determines that the target cell belongs to the RAN operator, the source cell may include in the handover request message to the target cell that a charging event needs to be triggered. Alternatively, the source cell may notify the source or target MME that a charging event may occur, and the MME may then inform the source cell to trigger the charging event in the path switch request message or any other S1-AP to the target eNB. Alternatively, it can trigger the event itself, as the target cell may be aware of the charging event for subsequent handovers.

As another example, the target eNB may determine from OAM configuration or other network configuration whether a handover from a particular neighbor cell or eNB belongs to a specific operator. This information may help the eNB determine whether a particular handover is an intra-RAN operator handover or a handover between a hosted operator cell and a RAN operator cell. This information may be used by the target eNB to determine whether to trigger a charging event.

In case of an inter-MME handover, e.g., a handover from a hosted operator MME to a RAN operator, the target MME can determine from the WTRU context from the source MME that the WTRU belongs to the hosted operator. The MME may then inform the RAN, P-GW, PCEF, PCRF, or any other node involved in the charging system to trigger the charging event.

The BCU may also be configured with the list of RAN operator eNBs. When the BCU determines that the WTRU is under the coverage of a particular eNB, it may inform the corresponding MME and/or eNB to start the charging event for the particular eNB.

In case of the idle mode mobility, the charging event may be triggered when the WTRU performs a tracking area update or location area update in the new cell. Upon receiving the TAU message, the MME in the target system (new MME) may request the WTRU context from the source MME (old MME). A new indication informing that the WTRU belongs to the hosted operator may be added in the context response message from the old MME. This indication may trigger the charging event at the target MME. The target MME may send an indication to the P-GW, PCEF, PCRF, or any other node involved in the charging system to start the corresponding charging process.

As another example, the WTRU may send the indication in the TAU request message indicating to the MME that it belongs to the hosted operator. The MME may then use this indication to trigger the charging event with the charging nodes disclosed herein.

Figure 22:
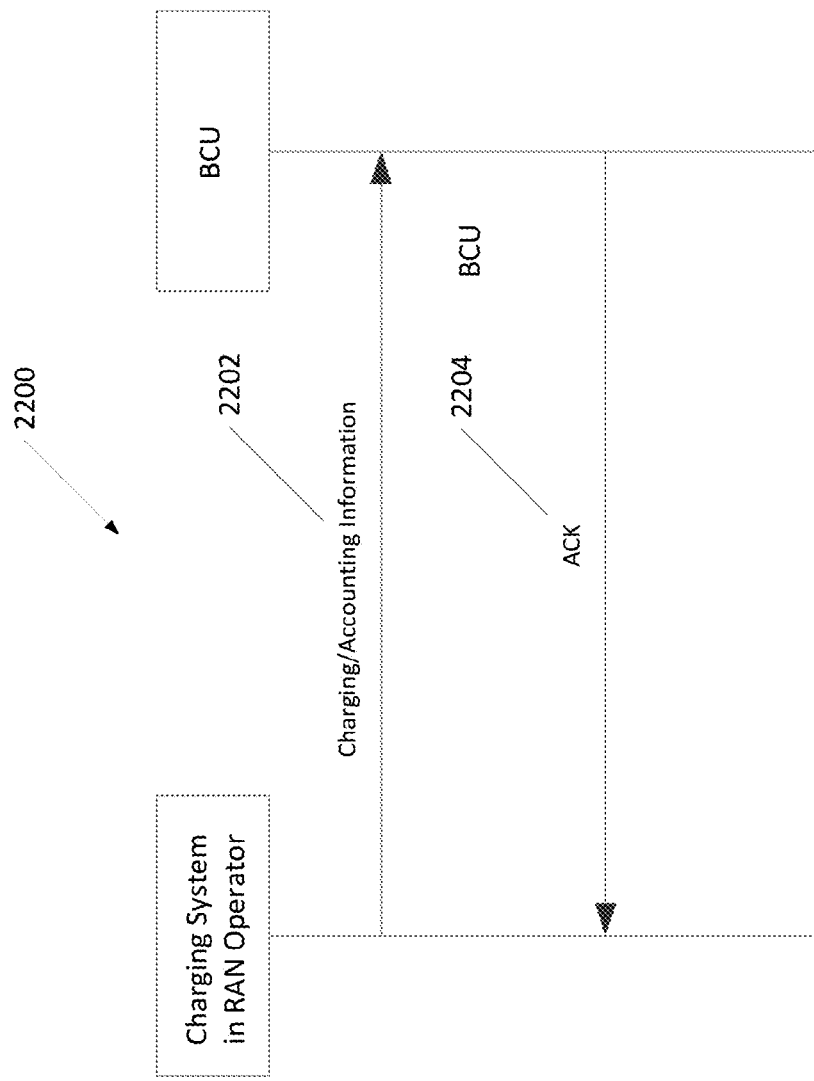
FIG. 22 illustrates an example procedure for transmitting charging information.

After a charging event is triggered, the charging node at the RAN operator may send the charging or accounting record or information to the BCU or any other charging control or OAM node of the hosted operator. FIG. 22 illustrates an example procedure 2200 for transmitting charging information 2202. The charging information 2202 may include, for example, a transaction ID, an identification of the requesting operator (PLMN_ID), locations (cell_id_list, etc.), information type (e.g., start of the charging event, end of the service, etc.), charging reason (e.g., handover from the hosted operator, resource modification, etc.), type of resources being used (e.g., QCI, QoS, call airtime, etc.), identity of the WTRU for which the record is being generated, and/or amount of resources being cancelled.

Upon receiving the charging information 2202, the hosted operator may or may not send an acknowledgement (ACK) 2204 in response. The BCU may then store the information or forward it to the charging system in the hosted operator. The information may then be used for accounting and billing the RAN operator.

The charging system may also handle a case in which the WTRU moves to a participating operator and therefore a charging event may be generated. If a handover occurs, the MME may inform the S-GW in the create session request message about the change in cell or serving node via User Location Information IE and/or Serving Node IE and/or indication flags IE in the create session request message. The S-GW may then forward this message to P-GW. In an example, the create session request message may include an IE, e.g., a RAN information IE. This IE may be included on the S11 interface for E-UTRAN Initial Attach and WTRU-requested PDN Connectivity procedures. It may include ECGI and TAI. The MME/SGSN may include it on the S11/S4 interface for TAU/RAU/X2-Handover/Enhanced SRNS Relocation procedure if the P-GW has requested location information change reporting and the MME/SGSN supports RAN information change reporting. The S-GW may include this IE on the S5/S8 interface if it receives the RI from the MME/SGSN. This IE may also be included on the S4 and S5/S8 interfaces for a PDP Context Activation procedure. It may include the CGI, SAI, and/or RAI. This IE may inform the charging system about the charging trigger when the WTRU moves to the cell of a participating operator.

In an example, the Change Report support indication may be updated in the indication flags IE of the create session request message to include RAN information change reporting. This flag may be set to 1 on the S11/S4 and S5/S8 interfaces during an E-UTRAN Initial Attach or a WTRU Requested PDN Connectivity or a PDP Context Activation procedure if the SGSN/MME supports RAN information change reporting.

Load balancing may be performed. A measurement disclosed herein may be used to support PLMN-specific load measurement for load balance in the RAN sharing environment.

A total hosted operator PRB usage may be measured. This may be done, for example, to measure the usage of frequency resources (PRB) usage for a particular hosted operator during a measurement time period T. This measurement may also be performed by measuring the usage of frequency resources (PRB usage) per hosted operator during a measurement time period T. The measurement result may be in the form of percentage PRB usage for a particular hosted operator or for each hosted operator.

Total hosted operator PRB usage per traffic class (QCI) may be measured. This may be done, for example, to measure the usage of frequency resources (PRB usage) per traffic class (QCI) for a particular hosted operator during a measurement time period T. This measurement may also be measured by measuring per traffic class (QCI) the usage of frequency resources (PRB usage) per hosted operator during a measurement time period T. The measurement result may be in the form of a percentage PRB usage for a particular hosted operator or for each hosted operator.

A downlink (DL) or uplink (UL) number of active hosted operator WTRUs may be measured. This may be done, for example, to measure the number of active downlink or uplink WTRUs for a hosted operator. An active WTRU may be defined as a WTRU for which there may be buffered data for the downlink or uplink in MAC, RLC, or PDCP protocol layers. This may also be measured by measuring the number of active downlink or uplink WTRUs for each hosted operator. To support measurement on the number of active WTRUs on per traffic class bases, the measurement may measure the number of active downlink or uplink WTRUs per traffic class for a specific hosted operator. The active downlink or uplink WTRU on a given QCI may be defined as a WTRU for which there may be buffered data for the downlink or uplink in MAC, RLC, and/or PDCP protocol layers for a Data Radio Bearer of a traffic class (QCI) equal to the given QCI. In another example, the measurement may be defined as a measurement that may measure the number of active downlink or uplink WTRUs per traffic class for each hosted operator.

Support resource status per PLMN may be measured. To support PLMN-specific load balancing, PLMN load reporting may be involved. Cell load may be reported on a per-PLMN basis. S1 load may be reported for each PLMN. The S1 load may be used to estimate the congestion level of a backhaul link. When the S1 link may be overloaded, the RAN may not admit more calls. PRB usage information may be reported for each hosted operator (PLMN) sharing the RAN. This may be done, for example, by repeating the current Radio Resource Status IE for each PLMN in the Resource Status Update Message. The Composite Available Capacity Group may also be reported on a per-PLMN basis.

An example of a Resource Status Update message may be shown below:

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | | YES | reject |
| eNB2 Measurement ID | M | | INTEGER (1 ... 4095, ... ) | | YES | reject |
| Cell Measurement Result | | 1 | | | YES | ignore |
| >Cell Measurement Result Item | | 1 to maxCellineNB | | | EACH | ignore |
| >>Cell ID | M | | ECGI 9.2.14 | | | |
| >>Hardware Load Indicator | O | | 9.2.34 | | | |
| >>S1 TNL Load Indicator | O | 1 to maxPLMN | 9.2.35 | | | |
| >>Radio Resource Status | O | 1 to maxPLMN | 9.2.37 | | | |

-continued

| | | | | RESOURCE STATUS UPDATE | | |
|---|---|---|---|---|---|---|
| IE/Group Name | Presence | Range | IE type and reference | Semantics description | Criticality | Assigned Criticality |
| >>Composite Available Capacity Group | O | 1 to maxPLMN | 9.2.44 | | YES | ignore |
| >>ABS Status | O | | 9.2.58 | | YES | ignore |

In a case that the peer eNBs may be shared by different hosted operators, the PLMN ID may be included in the Radio Resource Status IE, the S1 TNL Load Indicator, and the Composite Available Capacity Group to indicate the operator to which the measurement results belong.

As another example, the PLMN ID may be included directly in the Cell Measurement Result Item (e.g., after Cell ID). The hierarchy may then be for each Cell ID and for each PLMN ID, served by that cell, to provide the resource status report. An example of the Resource Status Request message and the Resource Status Update messages may be shown below:

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ...) | Allocated by $eNB_1$ | YES | reject |
| eNB2 Measurement ID | C-ifRegistrationRequestStop | | INTEGER (1 ... 4095, ...) | Allocated by $eNB_2$ | YES | ignore |
| Registration Request | M | | ENUMERATED(start, stop, ...) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Other bits shall be ignored by the $eNB_2$ | YES | reject |
| Cell To Report | | 1 | | Cell ID list for which measurement is needed | YES | ignore |
| >Cell To Report Item | | 1 ... <maxCellineNB> | | | EACH | ignore |
| >>Cell ID | M | | ECGI 9.2.14 | | — | — |
| >>>PLMN To Report | | | 1 to maxPLMN | | | |
| >>>PLMN ID | | | | | | |
| Reporting Periodicity | O | | ENUMERATED (1000 ms, 2000 ms, 5000 ms, 10000 ms, ...) | | YES | ignore |
| Partial Success Indicator | O | | ENUMERATED (partial success allowed, ...) | Included if partial success is allowed. | YES | ignore |

| IE/Group Name | Presence | Range | IE type and reference | Semantics description | Criticality | Assigned Criticality |
|---|---|---|---|---|---|---|
| RESOURCE STATUS UPDATE | | | | | | |
| Message Type | M | | 9.2.13 | | YES | ignore |
| eNB1 Measurement ID | M | | INTEGER (1 ... 4095, ... ) | | YES | reject |
| eNB2 Measurement ID | M | | INTEGER (1 ... 4095, ... ) | | YES | reject |
| Cell Measurement Result | | 1 | | | YES | ignore |
| >Cell Measurement Result Item | | 1 to maxCellineNB | | | EACH | ignore |
| >>Cell ID | M | | ECGI 9.2.14 | | | |
| >>>PLMN ID | M | 1 to maxPLMN | | | | |
| >>>Hardware Load Indicator | O | | 9.2.34 | | | |
| >>>S1 TNL Load Indicator | O | | 9.2.35 | | | |
| >>>Radio Resource Status | O | | 9.2.37 | | | |
| >>>Composite Available Capacity Group | O | | 9.2.44 | | YES | ignore |
| >>ABS Status | O | | 9.2.58 | | YES | ignore |

For each resource type, the Resource usage information may be interpreted as a relative quantity with respect to the total network resource allocated to the hosted operator.

Support may be provided to adjust a handover (HO) threshold on a per-PLMN basis. To support per-PLMN offloading rules, a method or methods may be used to modify the handover triggering condition for a WTRU that may belong to a different PLMN. For example, the Handover Trigger Change IE in the Mobility Change Request message may be duplicated for each PLMN. To support conditions under which the peer eNBs may be shared by different hosted operators, the operator information (PLMN) may be included in the Handover Trigger Change IE.

The following table shows an example of a Mobility Change Request Message:

| IE/Group Name | Presence | Range | IE type and reference | Semantics description | Criticality | Assigned Criticality |
|---|---|---|---|---|---|---|
| MOBILITY CHANGE REQUEST | | | | | | |
| Message Type | M | | 9.2.13 | | YES | reject |
| eNB1 Cell ID | M | | ECGI 9.2.14 | | YES | reject |
| eNB2 Cell ID | M | | ECGI 9.2.14 | | YES | reject |
| eNB1 Mobility Parameters | O | 1 to maxPLMN | Mobility Parameters Information 9.2.48 | Configuration change in eNB$_1$ cell. | YES | ignore |
| eNB2 Proposed Mobility Parameters | M | 1 to maxPLMN | Mobility Parameters Information 9.2.48 | Proposed configuration change in eNB$_2$ cell. | YES | reject |
| Cause | M | | 9.2.6 | | YES | reject |

Mobility Parameters Information

| IE/Group Name | Presence | Range | IE type and reference | Semantics description |
|---|---|---|---|---|
| Hosted operator ID | O | | PLMN | |
| Handover Trigger Change | M | | INTEGER (−20 . . . 20) | The actual value is IE value * 0.5 dB. |

MOBILITY CHANGE REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | reject |
| eNB2 Cell ID | M | | ECGI 9.2.14 | | YES | reject |
| eNB1 Mobility Parameters | O | | Mobility Parameters Information 9.2.48 | Configuration change in eNB$_1$ cell. | YES | ignore |
| eNB2 Proposed Mobility Parameters | M | | Mobility Parameters Information 9.2.48 | Proposed configuration change in eNB$_2$ cell. | YES | reject |
| Cause | M | | 9.2.6 | | YES | reject |

Mobility Parameters Information

| IE/Group Name | Presence | Range | IE type and reference | Semantics description |
|---|---|---|---|---|
| Hosted operator | O | 1 to maxPLMN | PLMN | |

-continued

Mobility Parameters Information

| IE/Group Name | Presence | Range | IE type and reference | Semantics description |
|---|---|---|---|---|
| List Handover Trigger Change | M | 1 to maxPLMN | INTEGER (−20 . . . 20) | The actual value is IE value * 0.5 dB. |

Another example may be to include both hosted operator and Handover Trigger Change in the Mobility Parameters Information IE.

In a case that eNB2 may reject the proposed Mobility Parameter proposed by eNB1, it may send back a Mobility Change Failure message. In this Failure message, it may indicate to the eNB1 the range of eNB2 Mobility Parameters for each hosted operator. As shown below, in the message, the eNB may also give the list of hosted operators that may share RAN resources:

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | ignore |
| eNB2 Cell ID | M | | ECGI 9.2.14 | | YES | ignore |
| Cause | M | | 9.2.6 | | YES | ignore |
| Hosted Operator List | | 1 to maxPLMN | | | | |
| eNB2 Mobility Parameters Modification Range | O | 1 to maxPLMN | 9.2.49 | | YES | ignore |
| Criticality Diagnostics | O | | 9.2.7 | | YES | ignore | eNB to distributing idle mode WTRU may be supported on a per-PLMN basis. To support eNB configure idle mode WTRU mobility on a per-PLMN basis, the cell may broadcast the host-specific cell reselection parameters, e.g., q-Hyst for each supported PLMN or q-OffsetCell for each supported PLMN. An example is shown below:

```
SystemInformationBlockType3 : : =    SEQUENCE {
  cellReselectionInfoCommon          SEQUENCE {
    q-Hyst                             SEQUENCE (SIZE (1 . . . maxPLMN)) of ENUMERATED {
                                         dB0, dB1, dB2, dB3, dB4, dB5, dB6, dB8, dB10,
                                         dB12, dB14, dB16, dB18, dB20, dB22, dB24},
SystemInformationBlockType4 : : =    SEQUENCE {
  intraFreqNeighCellList             IntraFreqNeighCellList                OPTIONAL,   -- Need OR
  intraFreqBlackCellList             IntraFreqBlackCellList                OPTIONAL,      --Need
OR
  csg-PhysCellIdRange                PhysCellIdRange                       OPTIONAL,   --Cond CSG
  . . . ,
  lateNonCriticalExtension           OCTET STRING                          OPTIONAL      --Need
OP
}
IntraFreqNeighCellList : : =         SEQUENCE (SIZE (1 . . . maxCellIntra)) OF IntraFreqNeighCellInfo
IntraFreqNeighCellInfo : : =         SEQUENCE {
  physCellId                           PhysCellId,
  q-OffsetCellperPLMN                  SEQUENCE (SIZE (1 . . . maxPLMN)) of Q-OffsetRange,
  . . .
}
```

Resource monitoring may be provided. The usage of the network resources in terms of the metrics disclosed herein may be monitored on a per-PLMN basis. The monitoring format may be defined as disclosed herein.

The resource usage monitoring may be done by the eNB, the HeNB, the BCU (e.g., after collecting resources usage from the various nodes under its control), and/or the eNB/HeNB and BCU in coordination with each other or in coordination with the core network nodes, such as MME, S-GW/P-GW.

Monitoring may be triggered by a request from a hosted operator on demand, an expiration of the timer associated with the resource usage reporting period, hosting operator configuration, or the like, or any combination thereof.

Reports may be exchanged between the hosting operator and the hosted operator. For example, the report may be exchanged between the hosting operator and the hosted operator using the schemes disclosed herein. The hosted operator may send a Resource Status Request message to the hosting operator. Upon receiving this message, the hosting operator may send a Resource Status Response message to acknowledge which reports have been successfully initiated. The hosting operator may follow with a Resource Status Update message to report the usage status as requested by the hosted operator.

Resource monitoring for network sharing may be provided. Hosting operators may share part of the networks, such as a S-GW, P-GW, or the like. This may be done, for example, to monitor network usage for each operator that may be sharing the same resource. The measurement may include any or all of a number of metrics alone or in any combination. One metric may be a GTP-U PDU volume that may be transmitted from a S-GW to a P-GW per operator. Another metric may be a GTP-U PDU volume that may be transmitted from a P-GW to a S-GW per operator. Another metric may be a number of GTP-U packets that may be transmitted from a S-GW to a P-GW per operator. Another metric may be a number of GTP-U packets that may be transmitted from a P-GW to a S-GW per operator. Another metric may be a number of GTP-C packets that may be transmitted from a S-GW to a P-GW per operator. Another metric may be a number of GTP-C packets that may be transmitted from a P-GW to a S-GW per operator. Another metric may be a number of GTP-C packets that may be transmitted from a S-GW to a P-GW per operator. Another metric may be a GTP-U PDU volume that may be transmitted from S-GW to SGSN per operator. Another metric may be a GTP-U PDU volume that may be transmitted from SGSN to S-GW per operator. Another metric may be a GTP-U PDU volume that may be transmitted from S-GW to eNB (S1U) per operator. Another metric may be a GTP-U PDU volume that may be received from S-GW to eNB (S1U) per operator. Another metric may be a number of GTP-U packets that may be transmitted from S-GW to eNB per operator. Another metric may be a number of GTP-U packets that may be transmitted from eNB to S-GW (S1U) per operator.

Resource management may be provided at a RAN node. A hosted operator or a host RAN may ensure that resource appropriation may not be violated when resources may be shared by more than one operator. The RAN or the CN may take a number of actions to ensure a fair distribution of resources. For example, the RAN node or any other node may query the BCU. This may be performed on a scheduled basis or upon request. This may be done, for example, to ensure that the shared network is aware of an allocation as the resource allocations may change. It may also be possible that, when an allocation change occurs, the BCU or any other controlling entity may pass this information to a shared node.

The BCU or other OAM node may push policies to a shared node to ensure a fair distribution of resources. The policies may be applied, for example, when the hosted operator exceeds its quota of allocated resources. The policies may help to ensure resource appropriation. For example, a shared node or a MME may not accept any more PDN connections, dedicated bearer requests, bearer modification procedures, or the like. As another example, the shared node may trigger a handover procedure, such as those disclosed herein, to offload some WTRUs to a neighborhood cell.

As another example, the BCU or other OAM node may push policies that may allow the shared node to request the BCU or any other controlling entity to go over the allocated resource appropriation. This information may be available at a shared node. For example, a BCU may have sent this information to the shared node when it connects to the BCU or when the resource allocation may be allowed by the BCU. The BCU may inform the shared node about the tolerance level. The shared node may then go up to the allowed tolerance in case the allocated quota is fully utilized and there may be resources available from other operators sharing the network.

As another example, the BCU or other OAM node may push policies that may allow the BCU to negotiate different charging rates with a hosted operator for using extra resources, such as more resources than allocated initially. If the hosted operator agrees to the charging policy for using extra resources, the RAN operator may then allow the hosted operator to exceed its allocated limit.

As another example, the BCU or similar entity may also push policies as to how to deal with current resources when the allocated resources reach the limit without exceeding the limit. These policies may include, for example, reducing the QoS of the current bearers, offloading to other RAT (e.g., Wi-Fi, 3GPP, or the like), configuring discontinuous reception (DRX) parameters, configuring idle mode sleep timers, configuring cell bearing and/or back-off timers, or the like.

The eNB or any other shared RAN may observe the allocation behavior over a period of time. These nodes may take note of an operator that may frequently be operating close to capacity and that may often exceed its allocated capacity. Such behavior may then be reported to the corresponding BCU. The BCU may then change the allocation and may inform the hosted operator or it may ask the hosted operator if it wants the allocation to be changed. The BCU or the RAN operator may pass the information to the hosted operator, and the hosted operator may then take a decision based on its own policies and OAM procedures. If the hosted operator decides to request more resources based on the information, it may do so using a resource request procedure disclosed herein. If the RAN operator observes that one of the hosted operator resources may be underutilized most of the time, it may decide to cancel these resources and may allocate them to an operator that may need more resources.

A portion of RAN resources may not be allocated to any operator and may be kept by the RAN node as reserve resources. These resources may be allocated to the hosted operators on demand or they may be allocated when one of the hosted operators exceeds the allocated resources. The RAN operator may charge differently for these reserve resources. These reserve resources may be taken back by the RAN operator at any time.

Each RAN operator in the virtual network architecture shown in FIGS. 5A-5B may allocate some or all of its RAN resources to the virtual network. If the resources are partially allocated to the virtual network, the resources may not be used by the RAN operator for WTRUs that do not belong to the virtual network. In some cases, when resources have been idle for some specified period of time and the RAN operator needs resources for its WTRUs, virtual network resources may be given back to the RAN operator. The RAN operator may have different types of resource appropriation with the virtual network. These types of resource appropriation may involve different pricing models.

As one example, the percentage or proportion of resources appropriated by the RAN operator to the virtual network may be dynamic. The virtual operator may request resources as needed from the RAN operator. The RAN operator may allocate resources dynamically to the virtual network if it has available resources.

As another example, the resources allocated by the RAN operator may not be allocated dynamically. When the resources are assigned to the virtual operator, the virtual operator may keep the resources even if the resources are idle in the virtual network. If the RAN operator needs resources, it may try to handover to another RAN operator and implement a load balancing technique.

As another example, the resources allocated by the RAN operator may be dynamic only from the perspective of the virtual network. For example, if the virtual network requires more resources, it may dynamically request them from the RAN operator, and these resources may be allocated to the virtual network dynamically. However, the RAN operator may not be able to request resources, for example, if it needs them for its WTRUs. When the virtual network no longer needs the resources, the resources may be returned back to the RAN operator.

These scenarios may be implemented in the virtual network using the RAN sharing architectures disclosed herein. In these architectures, some or all of the functionality of the BCU may reside in the Virtualization Layer Network Manager Function (VNMF) of the virtual network of FIGS. 5A-5B. This node may provide a number of functions to enable dynamic RAN sharing for this type of virtual network.

For example, the VNMF may receive queries and/or allocation requests on behalf of the virtual network from other operators, e.g., RAN operators and/or hosted operators. As another example, the VNMF may send queries and/or allocation results to the RAN operators if the virtual network RAN needs more resources. The VNMF may indicate to RAN nodes in the virtual network that load balancing may be needed. As another example, the VNMF may negotiate different resources parameters among operators, e.g., time for which resources are needed, quantity of resources, and other service attributes, such as QoS on behalf of the virtual operator. As another example, the VNMF may function as an arbitrator in case of multiple operators within the virtual network requesting a limited resource, such as by deciding which operator receives how much of a share of the limited resource. As another example, the VNMF may collect information regarding available resources from the shared RAN within the virtual network and from other RAN operators outside the virtual network. In case of a modification in resource allocation or appropriation, the VNMF may indicate to the shared RAN nodes about such modification, and they may change their allocation accordingly.

Further, charging for the virtual network RAN nodes may be collectively handled by the VPCRF node. When a charging event is triggered, an indication may be sent to the VPCRF to create a charging or accounting record. The VPCRF may send this charging or accounting record to the respective operator or operators for billing purposes. The VPCRF may implement a number of functions. For example, the VPCRF may report usage statistics from participating RAN nodes in the virtual network for charging. The VPCRF may send charging messages to hosted operators for the RAN resources being used. The VPCRF may enforce triggers for charging events as disclosed herein in the shared RAN nodes. The VPCRF may coordinate with the VNMF to gather statistics and information regarding usage of the resources and may provide this information to a Virtualization Layer Service and Application Control Function (VSACF) to ensure that certain services or applications may only be provided by specific RAN nodes.

Security and integrity parameters may be provided to ensure that resources are being allocated to or from an authorized operator. This functionality may be provided by the Virtualization Layer Service and Application Control Function (VSACF) node in the virtual network.

ECGI/Global eNB ID confusion may be addressed on a PLMN basis. With regard to the description of ECGI/Global eNB ID confusion described herein, each cell may be broadcasting a different PLMN ID or a different list of PLMN ID. One of the PLMN ID may be included in the Global eNB ID that may consist of a PLMN ID and an eNB ID. Together, they may be considered a unique Global eNB ID. Some example implementations may be employed to resolve this issue.

An eNB may have multiple unique eNB IDs. This may mean that each cell may broadcast the cell ID, which may include the eNB ID, with the one of the PLMNs it may be broadcasting. For example, if an eNB has three cells each broadcasting a different PLMN ID, then there may be different PLMN IDs included in the ECGI that may be broadcast by the cell. The Global eNB ID may be derived from the PLMN ID in the ECGI and the eNB ID in the ECGI. Accordingly, each cell may have a different unique Global eNB ID.

This Global eNB ID may be included in setting up the S1 connection between the eNB and the MME. The Global eNB ID may be included as an IE in the S1-AP connection setup request message. In this case, the eNB may include Global eNB IDs in the S1-AP setup request message, or the eNB may send multiple S1-AP setup request messages to the MME, each message having a different unique Global eNB ID. This may be done, for example, to help the MME send the handover message to the correct eNB in case of the handover. The RAN operators sharing the network may coordinate such that an eNB ID assigned to eNBs in different PLMNs may be unique to prevent routing confusion at the MME.

An eNB may assign a common or fake PLMN ID that may map to the PLMN IDs being broadcasted by the eNB. The mapping may be indicated to the MME or other eNBs so that during handover and other procedures, the messages may be routed to the correct eNB. Also, during the S1 setup procedure, this fake ID may be sent in the S1-AP setup request message. The mapping broadcasted PLMN IDs may be sent in the same S1-AP setup request or other S1-AP message.

During the handover, the source eNB may receive the ECGI cell ID for the target eNB in the measurement request. The ECGI may contain the fake PLMN ID. The source eNB may use the mapping table to convert the fake PLMN ID to a real PLMN ID and may send the message to the MME. As another example, the source eNB may send the handover message to the MME and the MME may do the conversion and may route the message to the correct target eNB. This solution may involve some form of coordination between operators sharing the RAN to ensure that there is no conflict in the local eNB ID, e.g., the local eNB IDs may be unique with the sharing PLMNs.

An eNB may randomly or with some predefined rules pick one of the PLMN IDs being broadcasted to be used in the Global eNB ID. The local eNB ID may not conflict between the PLMNs sharing the RAN.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for managing a radio access network (RAN) capacity with a plurality of operators, the method comprising:
    receiving, via a first brokerage control unit, a capacity query request from a participating operator of the plurality of operators requesting shared RAN resources;
    determining available shared RAN resources;
    sending a capacity query result granting the requested shared RAN resources from the available shared RAN resources to the participating operator; and
    conducting an accounting of usage of shared RAN resources by the participating operator.

2. The method of claim 1, further comprising receiving information relating to the available shared RAN resources from a shared RAN.

3. The method of claim 1, further comprising providing information relating to the accounting of usage of shared RAN resources by the participating operator to a charging system.

4. The method of claim 3, further comprising causing the charging system to charge the participating operator for usage of shared RAN resources.

5. The method of claim 1, wherein the capacity query request is received from a second brokerage control unit via an X2 interface.

6. The method of claim 1, further comprising determining whether to trigger a charging event associated with a handover event.

7. The method of claim 6, further comprising determining whether to trigger the charging event as a function of a type of the handover event.

8. The method of claim 1, wherein the capacity query result comprises at least one of a location associated with an available shared RAN resource, a Quality of Service (QoS) attribute of an available shared RAN resource, or a time period of an available shared RAN resource.

9. The method of claim 1, wherein the shared RAN resources are associated with a virtualized RAN operator.

10. A system for managing a radio access network (RAN) capacity with a plurality of operators, the system comprising:
    a first brokerage control unit configured to receive a capacity query request from a participating operator of the plurality of operators requesting shared RAN resources;
    a second brokerage control unit in communication with the first brokerage control unit and configured to send the capacity query request to the first brokerage control unit;
    a first charging system in communication with the first brokerage control unit; and
    a second charging system in communication with the second brokerage control unit,
    the first brokerage control unit configured to determine available shared RAN resources, to send a capacity query result granting the requested shared RAN resources from the available shared RAN resources to the participating operator, and to conduct an accounting of usage of shared RAN resources by the participating operator, the first charging system configured to generate charging information as a function of the accounting of the usage of the shared RAN resources by the participating operator and to send the charging information to the second charging system.

11. The system of claim 10, wherein the first brokerage control unit and the second brokerage control unit are in communication via an X2 interface.

12. The system of claim 10, wherein the first brokerage control unit is configured to determine whether to trigger a charging event associated with a handover event.

13. The system of claim 12, wherein the first brokerage control unit is configured to determine whether to trigger the charging event as a function of a type of the handover event.

14. The system of claim 10, wherein the capacity query result comprises at least one of a location associated with an available shared RAN resource, a Quality of Service (QoS) attribute of the available shared RAN resource, or a time period of the available shared RAN resource.

* * * * *